US010051930B2

(12) United States Patent
Heim

(10) Patent No.: US 10,051,930 B2
(45) Date of Patent: Aug. 21, 2018

(54) LENGTH-ADJUSTABLE POLE AND CLAMPING APPARATUS THEREFOR

(71) Applicant: LEKISPORT AG, Baar (CH)

(72) Inventor: Eberhard Heim, Unterensingen (DE)

(73) Assignee: LEKISPORT AG, Baar (CH)

( * ) Notice: Subject to any disclaimer, the term of this patent is extended or adjusted under 35 U.S.C. 154(b) by 231 days.

(21) Appl. No.: 14/914,693

(22) PCT Filed: Sep. 17, 2014

(86) PCT No.: PCT/EP2014/069777
§ 371 (c)(1),
(2) Date: Feb. 26, 2016

(87) PCT Pub. No.: WO2015/044012
PCT Pub. Date: Apr. 2, 2015

(65) Prior Publication Data
US 2016/0201706 A1   Jul. 14, 2016

(30) Foreign Application Priority Data

Sep. 27, 2013   (CH) ..................................... 1652/13
Jul. 8, 2014   (CH) ..................................... 1029/14

(51) Int. Cl.
*A45B 9/00* (2006.01)
*A63C 11/22* (2006.01)
*F16B 7/14* (2006.01)

(52) U.S. Cl.
CPC .............. *A45B 9/00* (2013.01); *A63C 11/221* (2013.01); *A45B 2009/007* (2013.01); *F16B 7/1418* (2013.01)

(58) Field of Classification Search
CPC .... B62K 25/02; B62K 2206/00; B62K 19/36; Y10T 403/595; B62J 1/08; F16B 7/1418; F16B 7/1454
See application file for complete search history.

(56) References Cited

U.S. PATENT DOCUMENTS 3,305,234 A * 2/1967 Cline ................. A63B 21/0728
24/270
4,497,092 A * 2/1985 Hoshino ............... F16B 7/1418
24/271
(Continued)

FOREIGN PATENT DOCUMENTS

DE         694 01 765 T2   10/1997
DE   20 2009 008 839 U1   11/2009
(Continued)

OTHER PUBLICATIONS

International Preliminary Report on Patentability dated Apr. 7, 2016 issued from the International Bureau in counterpart international application No. PCT/EP2014/069777.
(Continued)

*Primary Examiner* — Daniel J Wiley
(74) *Attorney, Agent, or Firm* — Sughrue Mion, PLLC

(57) ABSTRACT

A clamping apparatus (1) for a pole for axially fastening in a releasable manner an inner pipe segment (3) that can be inserted into an opening of the clamping apparatus. The clamping apparatus comprises a two-part plastic sleeve (5), which can be fastened to an outer pipe segment (2). The clamping apparatus also comprises a slotted clamp (16), which surrounds and clamps the plastic sleeve and which has a clamping lever (4), a lever arm (9) of which has an eccentric rolling region (8), by which the distance between a stop (12) and a counter surface (27) arranged on the outside of the first projection (13) can be reduced for clamping by pivoting the clamping lever (4) into the closed position.

29 Claims, 15 Drawing Sheets

(56) References Cited

U.S. PATENT DOCUMENTS

| | | | | |
|---|---|---|---|---|
| 4,744,690 A | * | 5/1988 | Hsieh | F16B 7/1418 248/411 |
| 4,957,388 A | * | 9/1990 | Liu | B62K 19/36 403/272 |
| 5,441,307 A | | 8/1995 | Quintana et al. | |
| 6,142,699 A | * | 11/2000 | Pao | F16B 7/1454 403/109.5 |
| 6,155,743 A | * | 12/2000 | Chen | F16B 7/1418 248/161 |
| 6,312,184 B1 | * | 11/2001 | Hoshino | F16B 7/1418 403/104 |
| 6,557,878 B2 | * | 5/2003 | Chen | B62J 1/08 280/226.1 |
| 6,948,878 B1 | * | 9/2005 | Smith, Jr. | F16B 2/185 403/110 |
| 6,972,042 B2 | * | 12/2005 | Benson | A61F 2/76 403/314 |
| 7,244,070 B2 | * | 7/2007 | Burnett | G03B 17/00 248/118 |
| 8,025,455 B2 | * | 9/2011 | Huang | F16B 7/1418 280/287 |
| 8,075,217 B2 | * | 12/2011 | Eason | F16B 7/0486 403/109.1 |
| 8,079,610 B2 | * | 12/2011 | Winefordner | B60B 27/026 280/281.1 |
| 8,256,983 B2 | * | 9/2012 | Lin | B62K 25/02 403/322.4 |
| 8,496,018 B2 | * | 7/2013 | Lenhart | A45B 9/00 135/75 |
| 8,608,118 B2 | * | 12/2013 | Lai | F16B 7/1454 248/74.1 |
| 8,832,910 B2 | * | 9/2014 | Lah | A63C 11/221 24/19 |
| 9,204,774 B1 | * | 12/2015 | Jackson | A47L 9/242 |
| 9,482,254 B2 | * | 11/2016 | Lai | F16B 7/1418 |
| 9,631,656 B2 | * | 4/2017 | Sato | F16B 7/1418 |
| 2002/0030146 A1 | * | 3/2002 | Akaike | F16M 11/32 248/157 |
| 2002/0076266 A1 | | 6/2002 | Mandon et al. | |
| 2005/0207829 A1 | | 9/2005 | Lenhart | |
| 2013/0312798 A1 | | 11/2013 | Lenhart et al. | |

FOREIGN PATENT DOCUMENTS

| | | |
|---|---|---|
| EP | 0 098 898 A1 | 1/1984 |
| EP | 1 217 224 A1 | 6/2002 |
| EP | 1 450 906 B1 | 6/2005 |
| WO | 2007/125166 A1 | 11/2007 |
| WO | 2010/085905 A1 | 8/2010 |

OTHER PUBLICATIONS

International Search Report for PCT/EP2014/069777 dated Oct. 13, 2014.

* cited by examiner

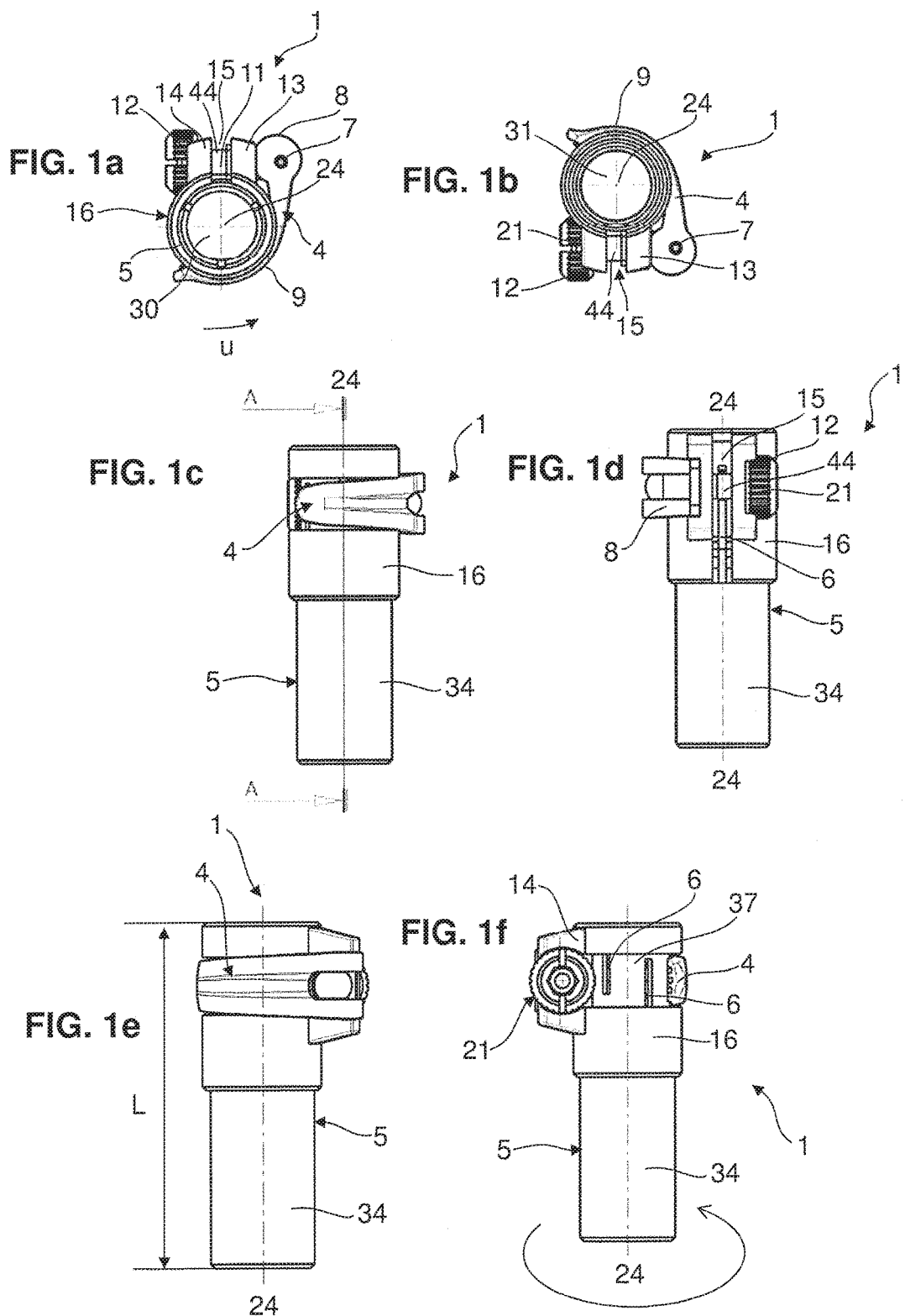

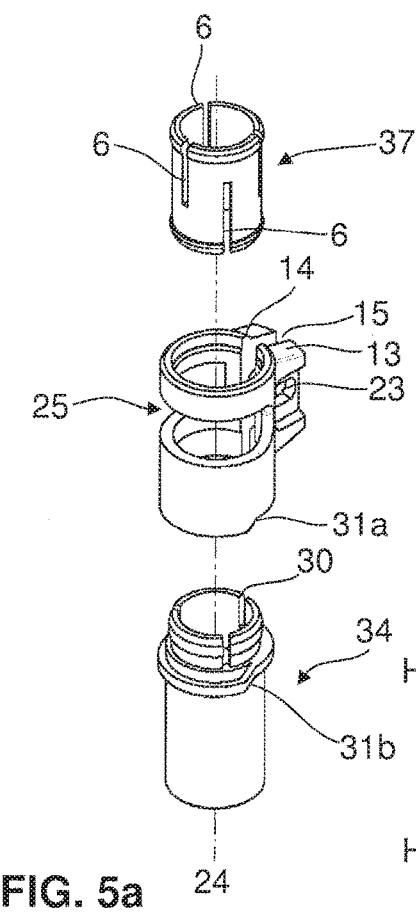
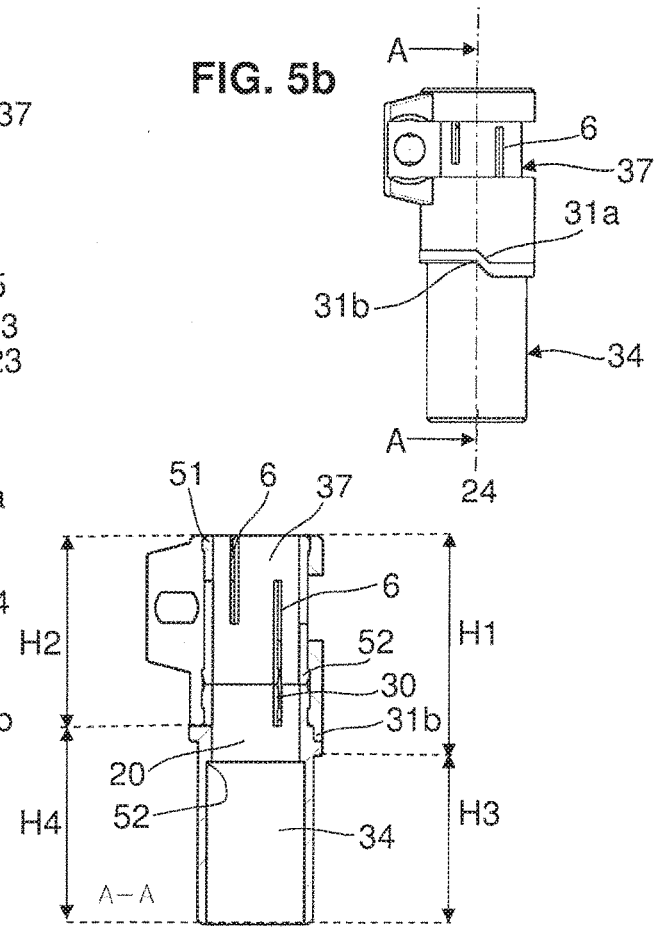
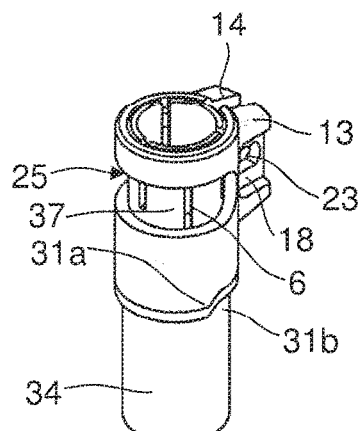
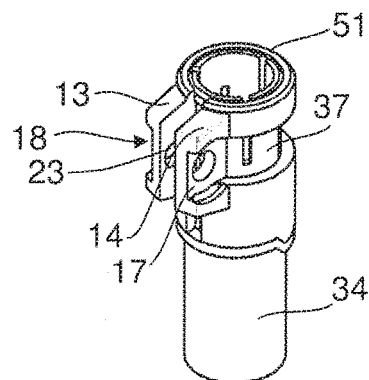
FIG. 5a
FIG. 5b
FIG. 5c
FIG. 5d
FIG. 5e

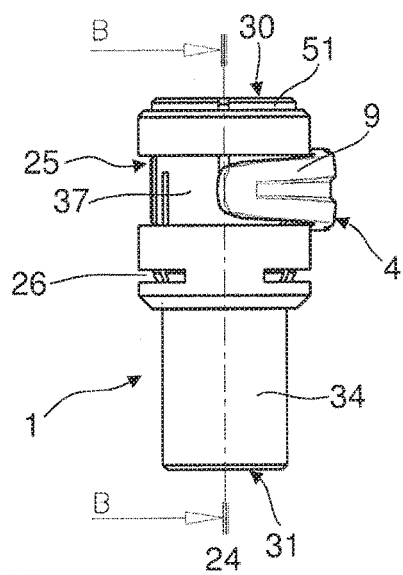
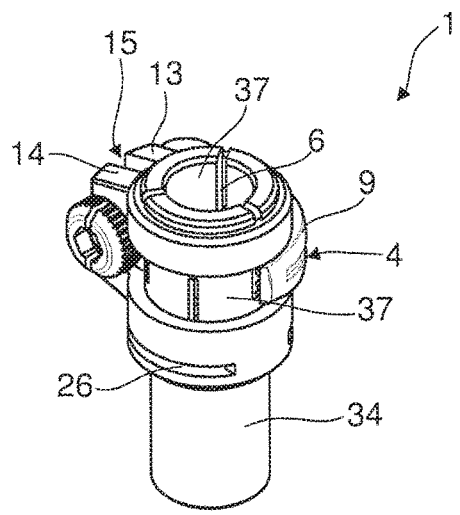
FIG. 7a
FIG. 7b
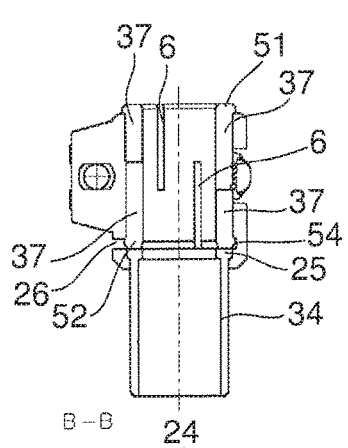
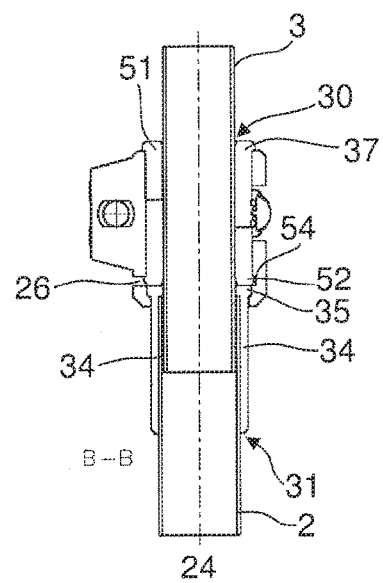
FIG. 7c
FIG. 7d

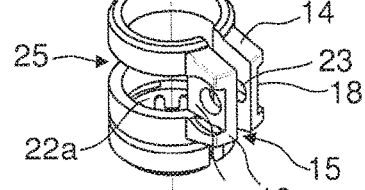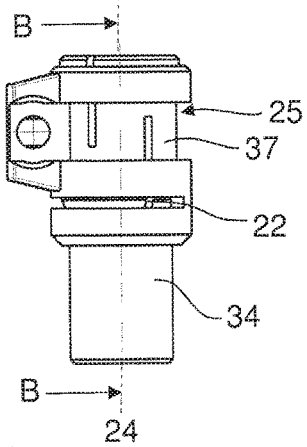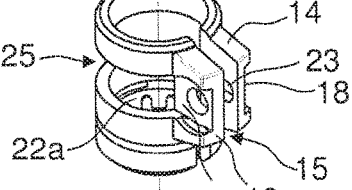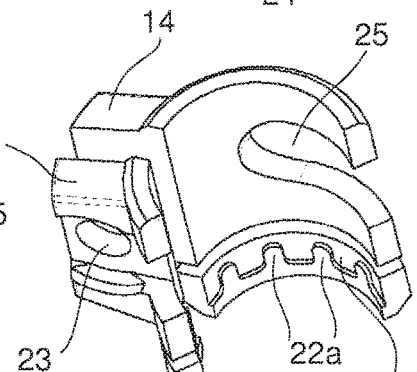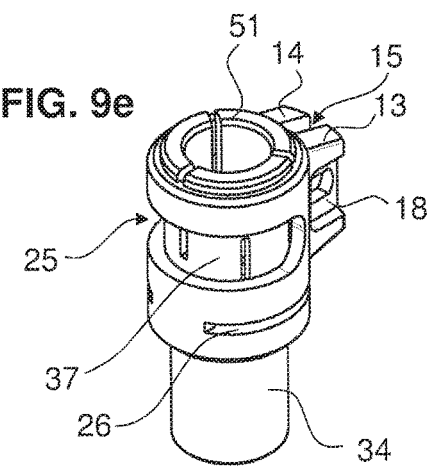

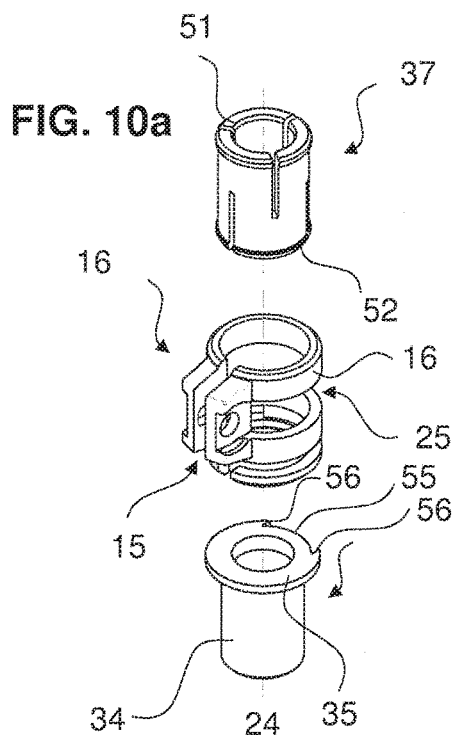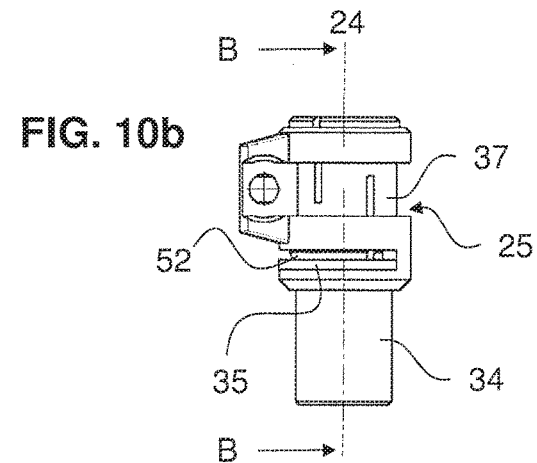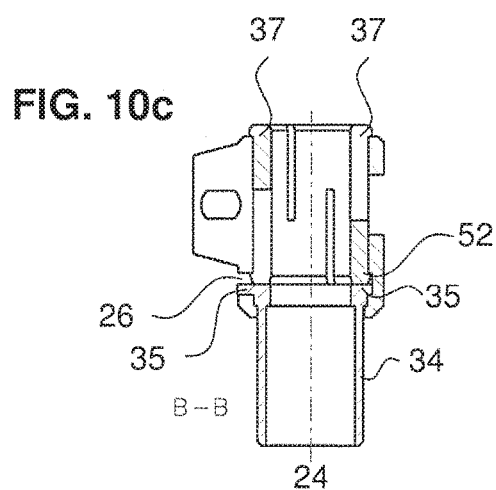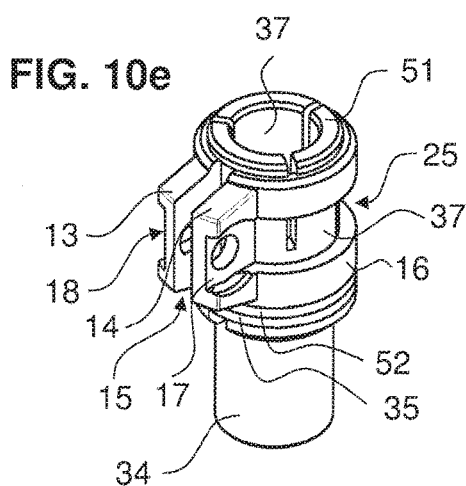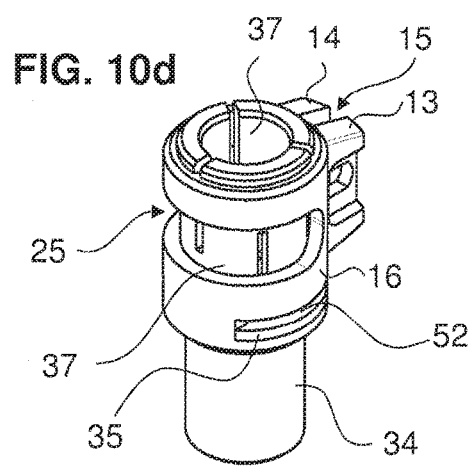

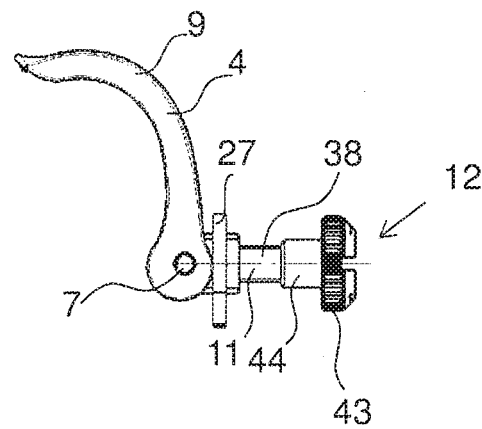
FIG. 13a
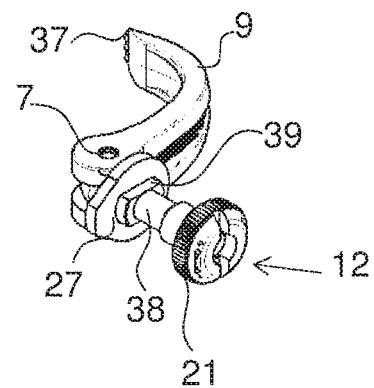
FIG. 13b
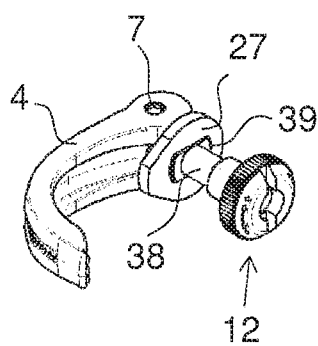
FIG. 13c
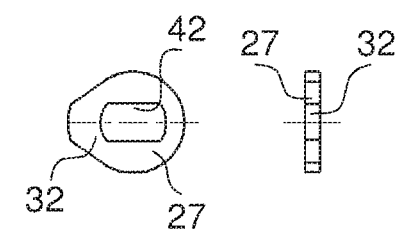
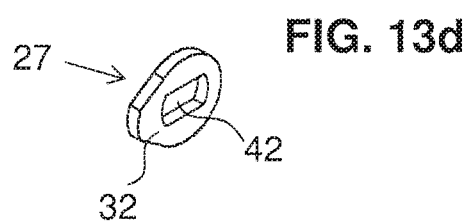
FIG. 13d
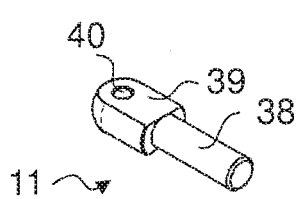
FIG. 13e
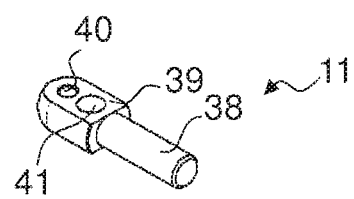
FIG. 13f

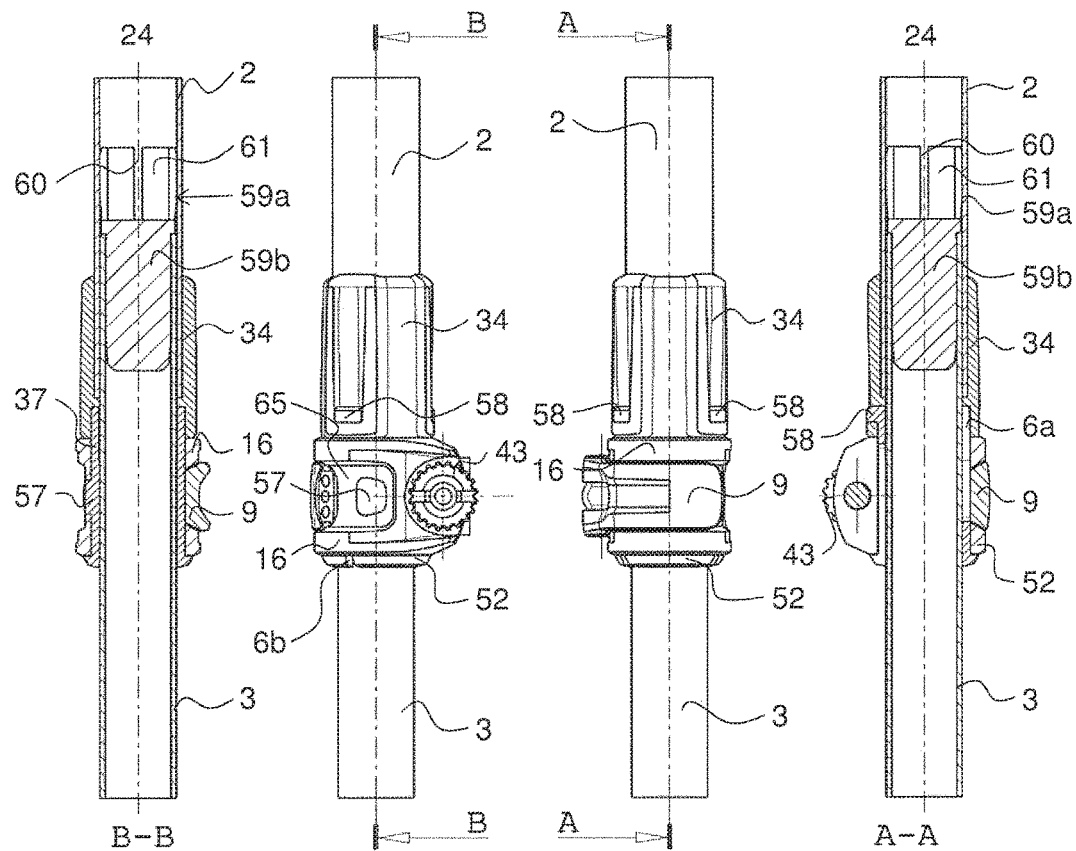
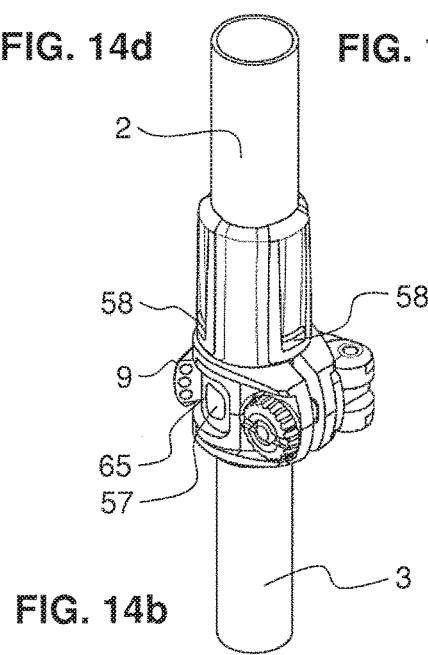
FIG. 14e  FIG. 14d  FIG. 14a  FIG. 14c
FIG. 14b

LENGTH-ADJUSTABLE POLE AND CLAMPING APPARATUS THEREFOR

CROSS REFERENCE TO RELATED APPLICATIONS

This application is a National Stage of International Application No. PCT/EP2014/069777 filed Sep. 17, 2014, claiming priority based on Swiss Patent Application Nos. 01652/13 filed Sep. 27, 2013 and 01029/14 filed Jul. 8, 2014, the contents of all of which are incorporated herein by reference in their entirety.

TECHNICAL SCOPE

The present invention relates to a length-adjustable pole, in particular for use as a hiking pole, trekking pole, Nordic walking pole, cross-country pole or ski pole, as well as to a clamping apparatus for fixing the relative position of tube portions of such a pole.

PRIOR ART

In order to develop a hiking pole, trekking pole, Nordic walking pole, cross-country pole or ski pole so that it is variable in length, mechanisms have been developed which make it possible to adjust the axial position of two tube portions which form the pole in a various manner in each case corresponding to the requirements. Two tube portions which comprise a different diameter are used, as a rule, for this purpose such that the one tube is able to be pushed into the other for adjustment.

On the one hand, there are apparatuses for this purpose where the clamping mechanism is arranged to a certain extent in the interior of the tubes forming the pole. EP 1 450 906 discloses, for example, an apparatus which provides a threaded rod which is fastened in an inner tube, projects into the outer tube and has a conically realized inner element with an internal thread mounted thereon. Around said inner element is arranged an expanding element with a counter cone which, when the inner element is driven into the expanding element as a result of rotating the two tube portions, is expanded in a manner that secures the two tube portions.

On the other hand, there are apparatuses which are arranged on the outside surface, in the manner of a clip. Thus, for example, DE 694 017 65 describes an apparatus where a plastic material sleeve and a clamping lever are arranged around a slotted tube, and where the clamping lever can be shifted by way of a pin which passes through projections that are arranged on the sleeve and consequently the clamping apparatus can be clamped. In the case of said structure, therefore, the inside tube is not clamped directly by the sleeve, but rather the sleeve rests on the outside tube, the outside tube has a slot, and the clamping apparatus in other words presses the outside tube onto the inside tube. A further substantially structurally identical clamping mechanism is disclosed in EP 0 988 98.

A further apparatus which is arranged on the outside is disclosed in EP 1 217 224. Here there is also a clamping lever, which here, however, can be shifted perpendicular to the pole axis in a tilt movement about an axis, and which is realized to a certain extent in a forked manner.

WO 2007/125166 A1 also discloses an outside clamping mechanism with a clamping lever that is movable perpendicular to the pole axis.

REPRESENTATION OF THE INVENTION

The object underlying the invention, among other things, is accordingly to propose an improved clamping apparatus for the above-specified purposes. The aim, in this case, is in particular to propose a clamping apparatus for a hiking pole, trekking pole, Nordic walking pole, cross-country pole or ski pole for axially fixing an inside tube portion, which is insertable into an opening of the clamping apparatus, so as to be releasable, and which enables an improved clamping force in particular also under different conditions and when using different tubes, which allows for easy relative displacement of the tubes, which can be produced in a simple manner and which can be developed in as thin a manner as possible, i.e. with regard to the axial and circumferential extension.

The solution to said object is achieved as a result of a clamping apparatus for a hiking pole, trekking pole, Nordic walking pole, cross-country pole or ski pole for axially fixing an inside tube portion, which is insertable into an opening of the clamping apparatus, so as to be releasable, being made available, wherein the clamping apparatus includes a plastic sleeve which is fastenable on an outside tube portion, which is insertable into a further opening of the clamping apparatus, encompasses the inside tube portion substantially directly at least in an axial portion and clamps it when the clamping apparatus is in the closed state. The plastic sleeve comprises at least one axial slot which makes the circumference of the plastic sleeve variable in said axial portion. As an alternative to this or in addition to it, the plastic sleeve can be realized, so that it can be clamped, at least in regions from a deformable elastomer material. The clamping apparatus additionally comprises a clamping clip which is arranged coaxially with respect to the plastic sleeve, encompasses the plastic sleeve at least in part in the axial direction and clamps it when closed. The clamping clip, at least in a region encompassing the plastic sleeve, comprises at least one axial slot, which makes the circumference of the clamping clip variable in said region, wherein on the clamping clip a first projection is arranged on a first side of said axial slot and a second projection is arranged on a second side of said axial slot (direction of extension of the projections substantially perpendicular to the axis of the tube portion). Each of the projections has a through opening which is arranged in a substantially perpendicular manner to the axis of the inside tube portion. A clamping lever is axially mounted on at least one of the projections, wherein the clamping lever comprises a lever arm which encompasses the clamping clip at least in part when the clamping apparatus is closed. The clamping lever comprises a roll-off region which is eccentric about a rotational axis of the clamping lever, by means of which roll-off region the spacing between a stop and a counter face for clamping, which is arranged on the outside surface of the first projection, can be reduced as a result of pivoting the clamping lever into the closed position. Eccentric, in this case, is to be understood in connection with the roll-off region as the radius of the roll-off region not being constant about the rotational axis of the lever, but in the decisive portion, that is to say at the point where, within the framework of the adjusting region of the lever, the roll-off region rests on the counter face, comprising a gradually increasing radius. This being so that with the clamping apparatus closed, that means with the clamping lever placed fully onto the clamping apparatus, said radius is substantially in its maximum position and consequently the spacing between the counter face and the stop assumes a minimum value, and with the clamping apparatus open, that means with the clamping lever standing out, the radius has a lesser value such that the spacing between the counter face and the stop assumes a larger value and consequently the slotted region of the sleeve comprises a larger inside diameter. The roll-off region and rotational axis of the lever are therefore arranged in an eccentric manner.

The proposed clamping apparatus is characterized in that the plastic sleeve is realized from two separate components, of which a first of the two separate components is realized as a tube sleeve, which is arranged coaxially with respect to the clamping clip, for fastening the clamping apparatus on the outside tube portion, and a second of the two separate components is realized as a clamping sleeve, which is arranged coaxially to the tube sleeve and to the clamping clip, for clamping the inside tube portion which is insertable into the outside tube portion. The outside tube portion encases or encompasses a bottom end of the inside tube portion in a region where the tube sleeve encompasses the outside tube portion. The outside tube, in this case, comprises an inside diameter which is substantially identical or only insignificantly greater than the outside diameter of the inside tube portion.

During clamping, the diameter of the clamping sleeve and where applicable additionally a diameter of a tapered upper portion of the tube sleeve is reduced, but not a diameter of the inside tube portion to be clamped. This means that the inside tube portion to be clamped is preferably not slotted or is realized in a non-slotted manner. Preferably neither the inside tube portion to be introduced into the clamping sleeve and to be clamped by the clamping sleeve nor the outside tube portion on which the tube sleeve is fastened is realized in a slotted manner. The clamping action consequently preferably only takes place by means of the clamping sleeve, where applicable additionally by means of the upper portion of the tube sleeve (insofar as said portion is realized in a slotted manner).

To achieve the clamping effect, the clamping sleeve comprises at least one or at least two, preferably at least three axially extending slots, wherein the slots are preferably distributed evenly around the circumference, and only preferably extend over part of an axial length of the plastic sleeve. The clamping sleeve preferably comprises three upwardly open axial slots, and preferably additionally three downwardly open, axial slots, the six slots preferably being evenly distributed over the circumference.

A particularly preferred embodiment is characterized in that at least on one axial end, the clamping sleeve comprises a circumferential flange, preferably at least one first flange on an upper end of the clamping sleeve remote from the tube sleeve. In a particularly preferred manner, the clamping sleeve comprises a first flange on its upper end and a second flange on its lower end. In this case, the upper and/or the lower flange preferably comprise a larger outside diameter than the cylindrical portion of the clamping sleeve (where there are two flanges, the cylindrical portion in between). The flange, in this case, can be directed radially inward or radially outward. The upper flange of the clamping sleeve, which is embraced at least in part by the clamping clip, can project beyond the upper edge on the upper end of the clamping clip remote from the tube sleeve and form an upper axial stop for the upper end of the clamping clip remote from the tube sleeve. As an alternative to this, however, the circumferential flange can also be encompassed by the clamping clip.

According to a further preferred embodiment, the tube sleeve comprises at least one preferably circumferential flange, preferably on an upper portion of the tube sleeve, preferably on its upper end facing the clamping sleeve, an upper circumferential flange. The at least one flange of the tube sleeve, in this case, can be directed radially inward or radially outward. In the case of a radially outwardly directed flange, said flange is preferably encompassed at least in part by the clamping clip or it engages in a circumferential groove on the inside surface of the clamping clip. However, for example, for the purposes of positive locking anti-rotation protection, it can also engage in a slot of the clamping clip which extends around at least in part in the circumferential direction of the clamping clip. However, the flange can also form a lower stop for the clamping sleeve and/or a lower end of the clamping clip facing the tube sleeve.

In addition to this or as an alternative to it, instead of being arranged on the upper end of the tube sleeve, the flange can be arranged such that it is situated between a larger diameter lower cylindrical portion and a smaller diameter upper portion.

According to a further embodiment, the clamping clip, in a lower portion facing the tube sleeve below the clamping lever, in a particularly preferred manner below an opening which extends around in part as described further below, has a slot which extends around in the circumferential direction of the clamping apparatus in part. A lower flange of the clamping sleeve and/or an upper flange of the tube sleeve can engage in said slot, as described further below for a preferred embodiment.

The clamping apparatus can comprise a means for anti-rotation protection, preferably between the clamping clip and the tube sleeve in order to prevent the clamping clip from rotating in relation to the tube sleeve. The means for anti-rotation protection is preferably realized in the form of positive locking, for example between the clamping clip and the tube sleeve, in particular by means of positive locking between the clamping clip and a flange of the tube sleeve that extends around at least in part. The positive locking for preventing rotational movement substantially between the tube sleeve and the clamping clip, in this case, can be achieved as a result of suitable means, for example as a result of meshing teeth, at least one corresponding or complementary shoulder, a step, etc. Possible in a particularly preferred manner is at least one radially outwardly protruding knob or projection at or on the outside surface of the clamping sleeve which engages in a recess or indentation in the clamping clip, for example in the region which is covered by the lever in the closed state. According to a particularly preferred embodiment, at its lower end the clamping clip comprises an edge which comprises two shoulders or steps which are arranged evenly around the circumference of the clamping clip. These are realized in a complementary manner to two corresponding steps on a preferably circumferential flange of the tube sleeve such that the clamping clip and the tube sleeve are secured against one another so as not to rotate. In the case of said embodiment, the tube sleeve preferably comprises a smaller diameter upper portion, which connects at the top to the circumferential flange and comprises radial ribbing or teeth for plug-in connection to the clamping clip (or another means for improving the connection to a lower portion of the clamping clip—the inside surface of the clamping clip preferably comprising corresponding complementary structures) and is realized in a slotted manner. In said upper portion the preferably three slots are advantageously arranged evenly in the circumferential direction about the circumference of the tube sleeve and are preferably in alignment with the slots of the clamping sleeve. No stepping or no shoulder is provided in the region of the axial slot of the clamping clip so as not to obstruct the clamping action of the clamping clip.

At its lower end the clamping clip can comprise an edge which comprises teeth or ribs which are aligned in the axial direction and have recesses located in between which are suitable to engage in corresponding recesses between corresponding teeth or ribs, which are aligned axially upwardly, i.e. toward the clamping clip, on the upper end of the tube sleeve. The teeth or ribs are preferably arranged evenly about the circumference of the clamping clip or tube sleeve in the circumferential direction, no teeth being provided, however, in the region of the axial slot of the clamping clip so as not to obstruct the clamping action of the clamping clip.

The teeth or ribs which are directed upward toward the clamping clip can comprise a smaller width than the teeth or ribs of the clamping clip which are directed downward, i.e. toward the tube sleeve.

According to a further embodiment, the clamping clip has a slot which is not continuous in the circumferential direction. Said slot can be realized in a non-circumferential manner in a region that is located opposite the axial slot of the clamping clip. Consequently, the slot comprises at least two circumferential ends. According to said preferred embodiment, a lower radially outwardly directed flange of the clamping sleeve engages in the circumferential slot. The clamping clip can have anti-twist protection in relation to the clamping sleeve, but does not have to if the clamping clip is arranged against the tube sleeve so as to not to be able to rotate. The aim is to avoid the clamping clip rotating when the clamping lever is closed. However, a functioning arrangement is also possible where the clamping sleeve, clamping clip and tube sleeve are secured against one another so as not to rotate together or in an interlinked manner. A counter force, which ends at the end in the tube sleeve, should preferably be present for receiving the generated torque. In addition, the tube sleeve comprises an upper circumferential flange which comprises axially downwardly directed teeth, i.e. away from the clamping clip. Said toothed flange is encompassed by a lower portion of the clamping clip which is preferably arranged below a circumferential slot of the clamping clip, said lower portion of the clamping clip also comprising axially downwardly directed teeth on (preferably only on) its inside surface. Said teeth, which are arranged on the inside surface of the clamping clip, can be lightly curved radially inward on the outside surface of the tube sleeve for the purposes of clamping the teeth such that the teeth of the clamping clip engage in corresponding recesses of the tube sleeve.

According to an alternative embodiment, not only a lower flange of the clamping sleeve engages in the partially circumferential slot of the clamping clip, but also an upper circumferential flange of the tube sleeve. The circumferential upper flange of the tube sleeve then comprises a radial shoulder which extends in the circumferential direction or a recess which reduces the outside diameter of the upper flange in the region of said recess in comparison to the remaining circumferential region of the flange. The circumferential region of the flange consequently engages in the slot, which extends around the clamping clip in a partial manner, and finds its stop on the two ends of the region on which the circumferential slot of the clamping clip is not realized in a circumferential manner. In this case, the non-circumferential region of the circumferential slot which is located opposite the axial slot of the clamping clip engages radially in the recess of the upper flange of the tube sleeve.

As the anti-rotation protection according to the invention is provided substantially between the clamping clip and the tube sleeve, the clamping sleeve can nevertheless preferably still be arranged so as to be freely rotatable in relation to the tube sleeve and/or in relation to the clamping clip.

According to a preferred embodiment, anti-rotation protection can be realized between the clamping sleeve and the tube sleeve by positive-locking means being provided which can be realized in particular in the form of ribs or tongues which are integrally formed on the axial end of the clamping sleeve facing the tube sleeve. Said ribs or tongues (one or several are possible in this case, e.g. two or three) can be realized, for example, directed outward in the radial direction, and can engage in indentations or recesses in a self-locking manner in the inside surface of the tube sleeve. The noses can comprise beveled edges in the insertion direction into the tube sleeve for said self-locking. The indentations or recesses in the tube sleeve are preferably provided in the region of the end of the tube sleeve facing the clamping sleeve. In an advantageous manner, the noses engage in openings in the wall of the tube sleeve so that releasing the latching connection between clamping sleeve and tube sleeve is still also possible subsequently in a non-destructive manner by actuating the noses from the outside.

The type of the anti-rotation protection of the clamping apparatus is not restricted to the embodiments described here and shown in the figures and can include further suitable, preferably form-locking, but definitely also force-locking and/or materially bonding variants.

When mounted on an outside tube portion, the tube sleeve can be fastened on the outside tube portion in a frictional-locking and/or positive-locking and/or materially bonding manner. The tube sleeve is preferably pressed on the outside tube portion. The tube sleeve, however, can also be bonded on the outside tube portion or, for example, latched in a positive locking manner in recesses of the outside tube as a result of elastically resilient regions. The clamping clip advantageously comprises an opening which extends around at least in part in the circumferential direction of the clamping clip, is arranged at the rear of the axial slot and which receives the lever arm at least in portions in the circumferential direction when the clamping apparatus is closed. This means the opening is preferably arranged in a portion of the clamping clip where the clamping lever encompasses the clamping clip when the clamping lever is in the closed position.

As an alternative to this, instead of an opening, the clamping clip can also comprise an indentation which extends around at least in part, is arranged at the rear of the slot and also receives the lever arm at least in portions in the circumferential direction when the clamping apparatus is closed.

A cross pin, which has a stop on the outside surface of the second projection and which comprises a rotational axis for the clamping lever, which rotational axis is arranged perpendicular to the axis of the cross pin and parallel to the axis of the tube portion, engages through the through opening which is arranged substantially perpendicular to the axis of the inside tube portion in each of the above-mentioned projections on the clamping clip. In this case, the opening in both projections is preferably a hole which is closed all round and preferably has a diameter within the range of 2-7 mm. The diameter of the cross pin is preferably within the range of 2-6 mm in the region that passes through said openings.

The slot between the two projections can be realized either as a simple linear radial slot, but it can also be realized, for example, in a curved or angular manner or can comprise multiple turns, which results in reduced susceptibility to dirt.

A further preferred embodiment is characterized in that the cross pin is realized in a T-shaped manner at its end on the side of the clamping lever, the lateral arms forming the rotational axis for the clamping lever, the clamping lever comprising a slot for the cross pin and said slot dividing the roll-off region into two roll-off regions arranged to the side of the cross pin.

The stop is preferably realized so as to be adjustable, i.e. it is possible to adjust the minimum spacing between the counter surface and the stop in a variable manner adapted to the requirements, which is of great advantage in particular for different temperatures, different clamping forces or in particular also in the case of wear, as re-adjustments are made possible. In addition, different tube diameters, for example resulting from tolerances or different coatings etc., can be compensated for in this way. In this case, the stop is preferably realized with a thread and the cross pin with a counter thread, and the stop is realized as a nut or screw. The cross pin, in this case, preferably comprises an external thread on its end facing the clamping lever. The cross pin is preferably realized from metal, but can also be produced from a highly sturdy plastics material (e.g. glass-fiber reinforced materials or carbon fiber-reinforced materials).

The stop preferably comprises circumferential teeth and/or a comb and/or a groove for the engagement of an adjusting tool. In a further preferred embodiment of the clamping apparatus, the stop is a knurled nut, the knurled nut preferably comprising a tapered portion and a wide portion, the tapered portion being able to engage in the opening and the tapered portion preferably having an internal thread which can move into operative connection with the external thread on the threaded portion of the cross pin.

It can also be advantageous when the cross pin has a flattened portion on its end remote from the clamping lever, the flattened portion preferably comprising a rounded angular cross section and an opening, which extends transversely, preferably substantially perpendicular to the main extension direction of the cross pin, being arranged in the flattened portion for the axial pin about which the clamping lever is pivotably mounted.

According to a further preferred embodiment, the counter surface is realized as a flat surface, preferably as a concave surface, the radius of curvature of which is adapted substantially to the radius of curvature of the roll-off region. Such a surface can be realized, for example, from plastics material.

A further preferred embodiment of the clamping apparatus comprises a counter surface in the form of a metal element which is arranged at least in part in an indentation in the first projection.

The metal element, in this case, according to an advantageous embodiment, in particular if the clamping clip is realized from plastics material and not from metal, can be realized in the form of a preferably integral metal band, which extends around the clamping clip on the outside surface thereof on the side located opposite the projections, the first end of which metal band is arranged in an indentation on the outside surface of the first projection facing the roll-off region and comprises a first recess or an opening for the cross pin, the central region of which metal band extends around the clamping clip, and the second end of which metal band is arranged preferably in an indentation on the outside surface of the second projection facing the stop and comprises a second recess or an opening for the cross pin and/or a stop element. Further embodiments of such a metal band are described in WO 2010/085905 A1.

According to an alternative embodiment, the metal band is realized in a (circular) disk-shaped manner and is arranged in an indentation in the first projection so as to be displaceable along the axis of the cross pin. In this case, the depth of the indentation is greater than the thickness of the metal element, the thickness of the metal element preferably being within the range of 0.5-3 mm, preferably within the range of 1-2 mm, and the depth of the indentation being within the range of 3-10 mm, preferably within the range of 5-8 mm. In principle, the metal element can be produced from steel, completely or in part from surface-hardened steel, or, for example, from hardened aluminum, from tin, titanium or another metal. The lever arm preferably encompasses the clamping clip at least in part, and, according to a further preferred embodiment, is arranged at least in portions in an opening in the clamping clip when the clamping apparatus is closed. As an alternative to this, an indentation, which extends around at least in part or also completely, into which the lever arm comes to rest at least in part when the clamping clip is closed, can be provided for the lever arm in the clamping clip. In an advantageous manner, the lever is produced from metal or from a sturdy plastics material, where applicable fiber-reinforced, preferably completely or in part from surface-hardened metal, hardened in particular in the roll-off region, integrally molded plastic regions preferably being provided, preferably produced from grip-friendly material.

Both the tube sleeve and the clamping sleeve are preferably produced from plastics material, but comprise a different material composition. The tube sleeve, in this case, is preferably realized from a material with partially elastic properties, and is preferably realized from a softer plastics material than the clamping sleeve. In a particularly preferred manner, the tube sleeve is realized from a thermoplastic material. Possible materials are, for example, polyethylene, polyamide (in particular PA66), polycarbonate, polypropylene, acrylonitrile butadiene styrene (ABS) or also mixtures (blends) or combinations (bicomponents) of such materials, where applicable with reinforcements produced from carbon fibers or glass fibers. This is in particular important so that the tube sleeve can also be pressed onto a surface-coated outside tube which has a slightly different outside diameter for production reasons.

The clamping sleeve is preferably realized from a friction-increasing plastics material with good recovery properties.

Thus, it can be advantageous, for example, when the tube sleeve is produced from tough but flexible plastics material, whilst the clamping sleeve is produced from a plastics material which has good adhesive friction on the tube material or the coating arranged thereon and where possible does not deform as a result of the continuous clamping. The tube sleeve is consequently produced in an advantageous manner from a material which makes it possible to compensate for differences in diameter and which makes it possible to fasten or press the tube sleeve also onto, for example, coated tubes. Both the clamping sleeve and the tube sleeve can be coated on their inside and/or outside surface.

In an advantageous manner, the clamping clip can be realized from hard plastics material or metal, for example from ABS, fiber-reinforced thermoplastic material, a light non-ferrous alloy, stainless steel with a thin wall or a combination of said materials. The lever can therefore also be realized from plastics material or can be realized as a metal lever with integrally formed or stuck-on plastics material actuating regions.

A particularly preferred embodiment of the invention relates to a pole, in particular a hiking pole, trekking pole, Nordic walking pole, cross-country pole or ski pole having a clamping apparatus according to one of the above-described embodiments. The clamping apparatus, in this case, serves for adjusting the length of at least two or three tube portions on the pole, wherein the inside tube portion which is to be clamped by the clamping apparatus is preferably realized without any slots. According to a further preferred embodiment, in addition to the clamping apparatus such a pole can comprise a clamping apparatus which is arranged on the inside surface of the tube portion and has at least one expanding element.

Further exemplary embodiments are described in the dependent claims.

BRIEF DESCRIPTION OF THE DRAWINGS

Preferred embodiments of the invention are described below by way of the drawings which serve purely for explanation, are not to be seen as limiting and in which:

FIG. 1 shows different schematic representations of a clamping apparatus according to a first preferred embodiment of the invention in the closed position, 1a showing the clamping apparatus when seen from above along the pole axis, 1b showing the clamping apparatus when seen from below along the pole axis, 1c-f showing different side views of the clamping apparatus;

FIG. 5 shows a clamping apparatus according to a second preferred embodiment of the invention in a representation without a clamping lever or its fastening, 5a showing an exploded view, 5b showing a side view, 5c showing a sectional representation along the line A-A of 5b, and 5d and 5e each showing a perspective view;

FIG. 7 shows a clamping apparatus according to a fourth preferred embodiment of the invention in the closed position, 7a showing a schematic representation of a side view of the clamping apparatus, 7b showing a perspective view, 7c showing a sectional representation along the line B-B of 7a without tube portions and 7d showing a sectional representation along the line B-B of 7a with tube portions;

FIG. 9 shows a clamping apparatus according to a fifth preferred embodiment of the invention in a representation without a clamping lever or its fastening, 9a showing an exploded view, 9b showing a side view, 9c showing a sectional representation along the line B-B of 9b, and 9d and 9e each showing a perspective view, whilst 9f shows a perspective view of an axial section;

FIG. 10 shows a clamping apparatus according to a sixth preferred embodiment of the invention in a representation without a clamping lever or its fastening, 10a showing an exploded view, 10b showing a side view, 10c showing a sectional representation and 10d and 10e each showing a perspective view;

FIG. 13 shows a preferred embodiment of a clamping lever of a clamping apparatus according to the invention with a stop, 13a showing a side view of only a lever, pin and adjusting screw as well as a metal element in the open position, 13b showing a perspective view of the same, 13c showing a perspective view of the correspondingly closed lever, 13d showing a top view, side view and perspective view of the metal element, 13e showing a perspective view of the cross pin and 13f showing a perspective view of a slightly modified embodiment of the cross pin;

FIG. 14 shows a clamping apparatus according to an eighth preferred embodiment of the invention in the closed position, a) showing a side view of a schematic representation of the clamping apparatus; b) a perspective view; c) a sectional representation along the line A-A of a); d) a side view of a schematic representation of the clamping apparatus rotated by 180 degrees compared to a); and e) a sectional representation along the line B-B of d);

DESCRIPTION OF PREFERRED EXEMPLARY EMBODIMENTS

Figure 2A:
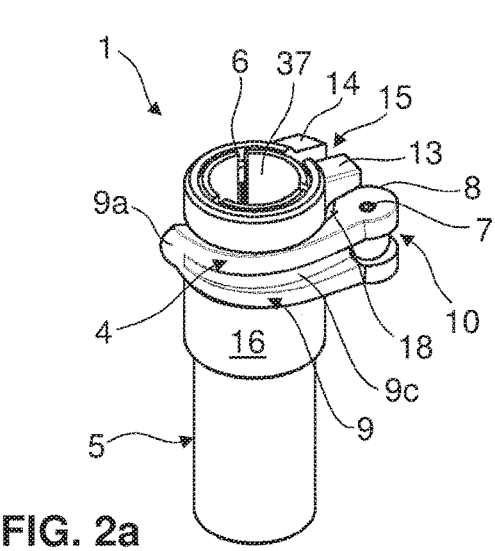
FIG. 2 shows four different perspective views 2a-2d of the clamping apparatus according to 1.

FIG. 1-4 show a first preferred embodiment of a clamping apparatus according to the invention.

FIGS. 1-4 show a plastics material sleeve 5 which is encompassed in an upper portion of a clamping clip 16. The plastic sleeve consequently comprises a lower portion in which the plastic sleeve 5 is fastened on an outside tube portion 2, and an upper portion in which the plastic sleeve 5 is realized for clamping an inside tube portion 3 which is insertable into an upper opening of the clamping apparatus 1 or into the fastened outside tube portion 2. Consequently, the clamping apparatus 1 exerts its clamping action in particular in the upper portion of the clamping sleeve in the region of the clamping sleeve 37. The two-component design of the plastic sleeve 5—divided into a clamping sleeve 37 and a tube sleeve 34—can be seen particularly well in the exploded view of FIG. 4. The tube sleeve 34 encompasses an upper end of the outside tube portion 2 and is fastened thereto, preferably pressed thereon. To this end, the tube sleeve 34 comprises an inner radial shoulder 53 which serves as a stop for the upper end of the outside tube portion 2. A repeatedly slotted clamping sleeve connects upward to the tube sleeve 34 coaxially along the longitudinal axis of the clamping apparatus 1 or of the pole axis 24. In this case, the inside diameter of the clamping sleeve 37 is smaller than the inside diameter of the tube sleeve 34, the inside diameter of the tube sleeve 34 corresponding substantially to the outside diameter of the inside tube portion, or is just smaller such that the inside tube portion is able to be inserted precisely into the outside tube portion. According to the exemplary embodiment of FIG. 1-4, six slots 6 are distributed evenly around the circumference of the clamping sleeve 37, in each case three slots 6 being realized open at the top and three slots 6 being realized open at the bottom. According to said first preferred embodiment of FIG. 1-4, the tube sleeve 34 comprises a lower cylindrical portion with a larger outside diameter which is realized in a non-slotted manner, and an upper tapered portion 20 with a smaller outside diameter than that of the lower portion. In this case, the upper tapered portion 20 is also slotted and the shown three upwardly open slots 30 of the tube sleeve 34 are in alignment with the downwardly open slots 6 of the clamping sleeve 37, which can be seen easily in particular in FIG. 3.

The clamping clip 16 encompasses the plastic sleeve 5 in the axial direction at least in part and, when closed, clamps it. The clamping clip 16 extends around the plastic sleeve 5 on the outside surface thereof preferably in the form of an integral metal band. In the region encompassing the plastic sleeve 5, the clamping clip 16 comprises an axial slot 15 which makes the circumference of the clamping clip 16 variable in said region, a first projection 13 being arranged on the clamping clip 16 on a first side of said axial slot 15 and a second projection 14 being arranged on a second side of said axial slot. Each of said projections 13, 14 comprises a through opening 23 which is arranged substantially perpendicular to the axis 24 of the inside tube portion 3 or to the longitudinal axis of the clamping apparatus, a clamping lever 4 being axially mounted on the first projection 13. Said clamping lever 4 comprises a lever arm 9 which, when the clamping apparatus 1 is closed, at least partially encompasses the clamping clip 16. The lever arm 9, in this case, is received in its region encompassing the clamping clip in part in an opening 25 which is realized at least circumferentially in part in the circumferential direction U of the clamping clip 16. The clamping lever 4 comprises a roll-off region 8 which is eccentric about a rotational axis 7 of the clamping lever 4, by means of which the spacing between a stop 12 and a counter surface for clamping arranged on the outside surface of the first projection 13 can be reduced as a result of pivoting the clamping lever 4 into the closed position. Said counter surface is realized as a metal element 27, or a small metal plate in the embodiments shown in FIGS. 4 and 8.

A first end of the lever arm 9 is arranged in an indentation 18 on the outside surface of the first projection 13 facing the roll-off region 8 and comprises a first recess or an opening for the cross pin 11. The central region of the lever arm 9 extends around the plastic sleeve 5 in the region of the opening 25. The second end of the lever arm 9 is arranged in an indentation 17 on the outside surface of the second projection 14 facing the stop 12 and comprises a second recess or an opening for the cross pin 11 and/or a stop element 12.

Figure 2B:
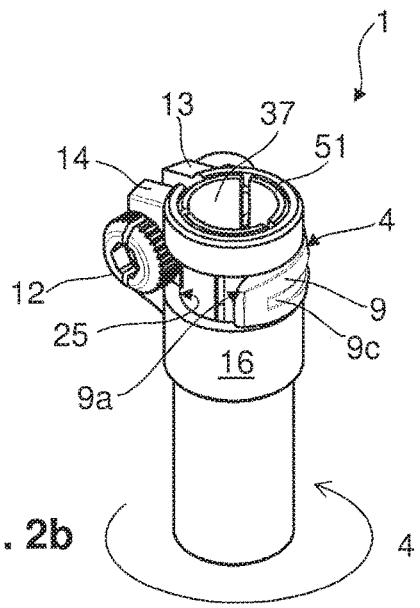
Figure 2C:
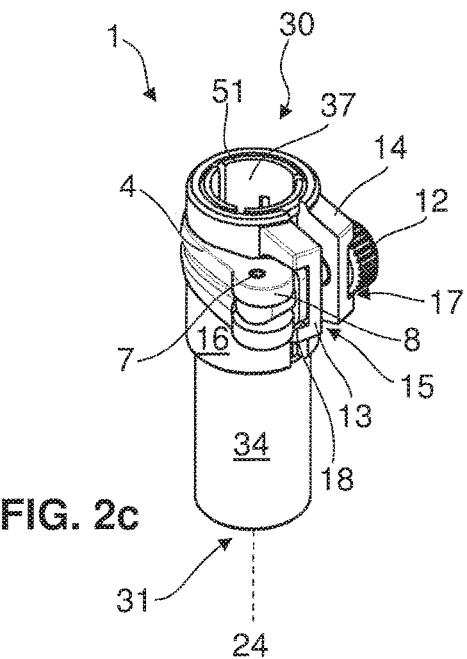
Figure 2D:
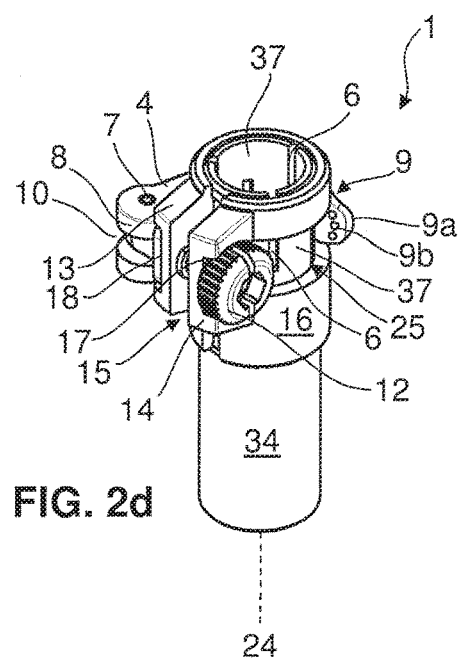

The metal band realized as the clamping clip 16 is realized in a circumferential manner on the side opposite the projections 13, 14 with the exception of an opening 25. In the closed position, the narrow lever arm 9, as can be seen from FIGS. 2b and 2d, is located in said circumferential opening 25 arranged at the back of the slot. In the case of said exemplary embodiment, the clamping lever 4 is narrow and realized tapering lightly toward its tip 9a. Gripping knobs 9b are additionally arranged on the inside surface of the slightly outwardly bulging tip of the clamping lever 4. Thus, there is on one hand a harmonious transition of the overall contour, as a result of the bulging at the tip together with the gripping knobs, the lever is, however, easily able to be grasped and pivoted up with a finger, where applicable also with a glove, for releasing the closed position. The lever 4 additionally has an indentation 9c on its bottom surface facing the clamping clip.

The cross pin 11, which is to be described again in detail further below, is developed here as a pin with an external thread arranged on its end facing the lever. An adjusting screw 12, or rather a specially developed knurled nut is screwed onto said external thread. The interaction between the cross pin 11, lever and adjusting screw 12 is to be explained in more detail by way of FIGS. 13a-f.

At its one end, the cross pin 11 has a flattened portion 39 which here comprises a rounded rectangular cross section. A transversely extending opening 40 for the axial pin 7, about which the lever 4 is pivotably mounted, is arranged in said flattened region 39. The direction of said opening 40 is substantially perpendicular to the main direction of extension of the cross pin 11. A threaded portion 38, which essentially provides a screw portion, is integrally molded on said flattened region 39.

Figure 12:
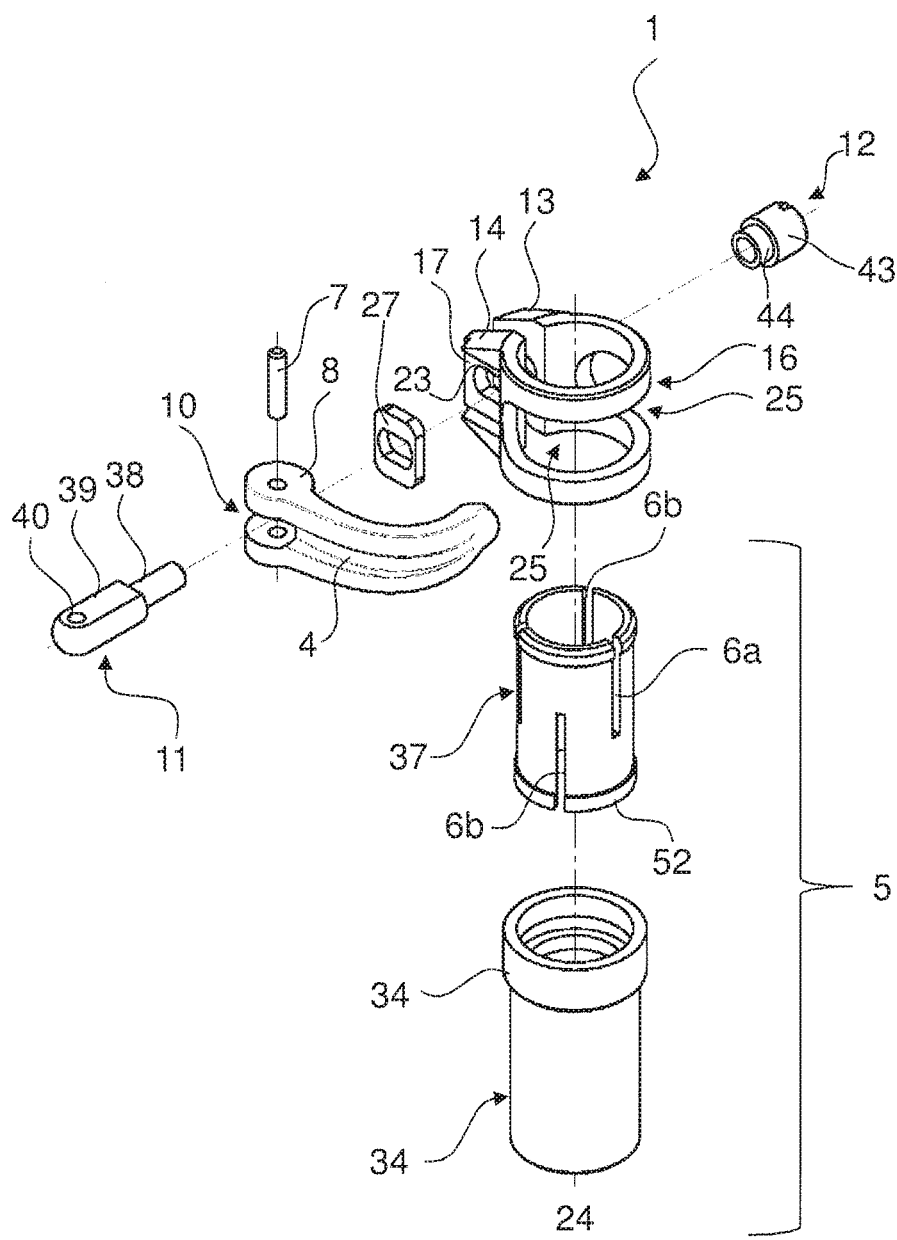
FIG. 12 shows an exploded view of the clamping apparatus according to FIG. 11.

The flattened portion 39 of the cross pin 11 has substantially the same, simply somewhat smaller, cross sectional area as an elongated opening 42 in the metal element 27. According to the exemplary embodiments shown in FIGS. 4 and 8 and 12, said opening 42 is realized as a rounded rectangle, but it could also comprise a different form simply corresponding to the cross sectional area of the flattened portion 39, for example it could be cuboid, but it could also comprise a different form adapted to the cross sectional area of the portion 39. It simply should be a non-circular form so that the pin 11 is not able to rotate in the metal element 27, and that consequently neither the cross pin 11 nor the lever arm 4 are able to rotate in relation to the sleeve about the axis of the cross pin 11.

The length of the flattened region 39 then in the axial direction of the cross pin 11 is such that it is always engaged in the matching opening 42 both in the closed position (cf. FIG. 13c) and in the open position (cf. FIG. 13b). This ensures that the relative guiding of opening 42 and flattened region 39 in each lever position is ensured.

A special embodiment of such a cross pin 11 is shown in FIG. 13f. In particular in the case of poles which comprise three tube portions and in a corresponding manner require two such clamping mechanisms, it is important for the corresponding structure of the clamp to be as lightweight as possible. In order to make a reduction in weight possible, in the case of the cross pin 11 a further bore, an additional bore 41, can be arranged in the region where the flattened portion 39 serves for guiding in the opening 42. Said bore, as shown in FIG. 13f, can extend to a certain extent parallel to the opening 40, it can, however, also extend perpendicular thereto or it is possible to provide two such bores which meet in the center of the pin.

A further weight saving would be possible if a cavity were arranged in the threaded portion 38 or by realizing the cross pin 11, for example, as a two-component part where the threaded region 38 consists of metal and the flattened region 39 of plastics material, or where the threaded region 38 is also only realized on its outside surface from a metal threaded sleeve and plastics material is arranged in its interior.

According to an alternative exemplary embodiment shown in FIG. 13d, over the main part of its circumference the metal element 27 can also have a circular outside form which is widened somewhat on one side in the manner of a continuation 32. Said continuation 32 would then engage in a corresponding widening which would be provided in the indentation 18 in the projection 13 and thus would prevent the metal element 27 being able to rotate to a certain extent about the axis of the cross pin 11 in the indentation 18, and consequently also the cross pin 11 and the lever arm 4 being able to rotate about the axis of the cross pin 11. The knurled nut shown in FIG. 13 has a tapered portion 44, which preferably has an internal thread which interacts with an external thread on the threaded portion 38 of the cross pin 11, and a wide portion 43 which is designed in particular to rest on a shoulder which is formed by the indentation 17, for example according to FIG. 2d, in order to make it possible in this manner for the lever force to cooperate with the projection 14. The tapered portion 44 engages in the opening 23, as can be seen for example by way of FIGS. 1a, 1b and 1d.

In addition, the wide adjusting portion 43 on the one hand has teeth 21 on the outside surface so that the adjustment can be completed simply with fingers, on the other side there is a slot 36 in which, for example, it is possible to engage with a tool or a coin. On the front side there is the additional specification in which direction it is necessary to rotate so that the screw can be secured or released. Further special embodiments of knurled nuts are described in WO 2010/085905 A1.

According to the exemplary embodiment of FIG. 1-4, the clamping clip extends over approximately half of the overall length L of the clamping apparatus 1. The portion of the tube sleeve 34 protruding at the bottom out of the clamping clip 1 consequently also makes up approximately half of the length L of the clamping apparatus 1.

It can be seen in FIG. 1f that the portion of the clamping sleeve 37 clamped by the clamping clip 16 is accessible or visible in part through the opening 25 of the clamping clip.

Figure 3A:
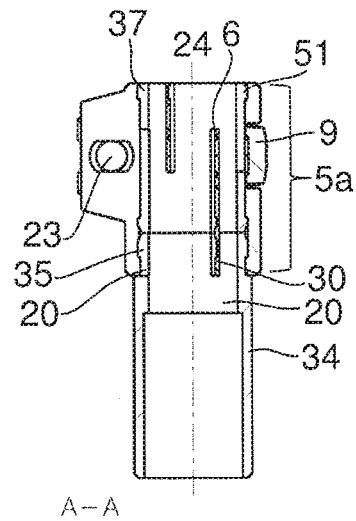
FIG. 3 shows a sectional representation of the clamping apparatus according to FIGS. 1 and 2 along the line A-A of 1c, 3a showing the clamping apparatus without tube portions inserted and 3b showing the clamping apparatus fastened to an outside tube portion with an inside tube portion inserted.

It can be seen from the sectional representations of FIG. 3 how the clamping clip 16 encompasses the plastic sleeve 5 in part, said plastic sleeve consisting of the two components of the tube sleeve 34 and the clamping sleeve 37 in said exemplary embodiment.

The clamping sleeve 37 comprises one circumferential flange each on its upper and lower end. Consequently, the upper and lower end of the clamping sleeve 37 have a larger diameter than the central, cylindrical portion of the clamping sleeve 37. According to said exemplary embodiment, the clamping clip 16 encompasses both the upper first flange 51 and the lower second flange 52 of the clamping sleeve. In addition, in its lower portion, the clamping clip 16 also encompasses an upper flange 35 in the tapered upper portion 20 of the tube sleeve 34 which connects axially to the lower end of the clamping sleeve 37 and has substantially the same inside diameter as the clamping sleeve 37. To improve the anchoring of the tube sleeve 34 in the clamping clip 16, positive-locking means can also be arranged on the tapered portion 20 of the tube sleeve 34 and/or on the inside surface of the clamping clip 16. In the present exemplary embodiment, the upper tapered portion 20 of the tube sleeve 34 comprises ribbing or notching for this purpose.

The lower end of the clamping clip 16 rests on a shoulder of the tube sleeve 34 which defines the lower end of the tapered portion 20.

Figure 3B:
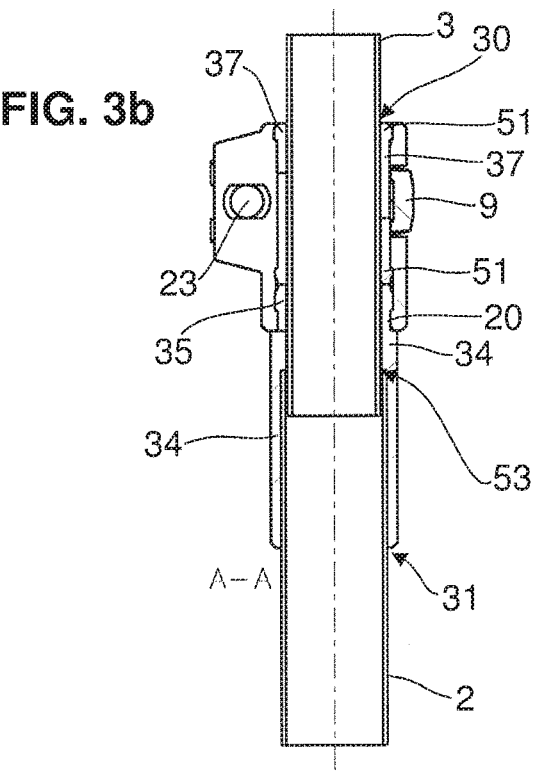
Figure 4:
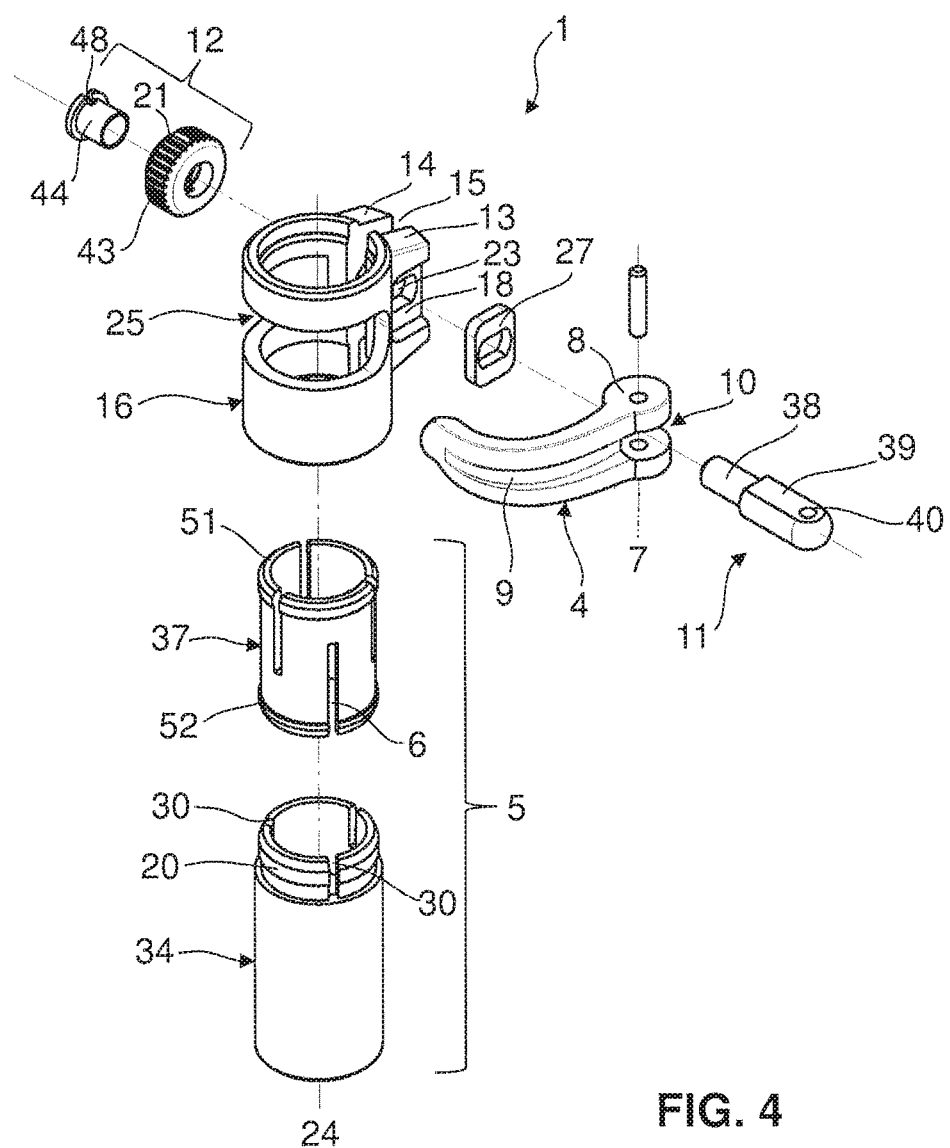
FIG. 4 shows an exploded view of the clamping apparatus according to FIG. 1-3.
Figure 6A:
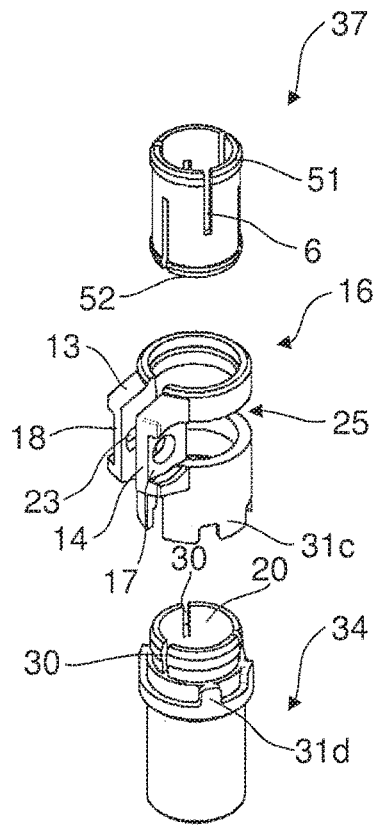
FIG. 6 shows a clamping apparatus according to a third preferred embodiment of the invention in a representation without a clamping lever or its fastening, 6a showing an exploded view, 6b showing a side view, 6c showing a sectional representation along the line A-A of 6b, and 6d and 6e each showing a perspective view.
Figure 6B:
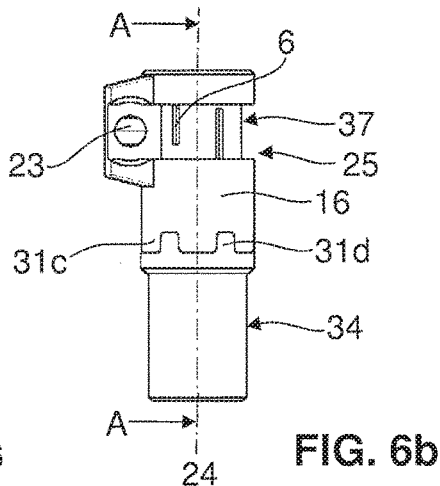
Figure 6C:
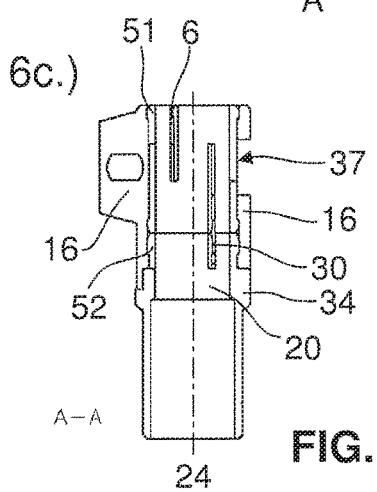
Figure 6D:
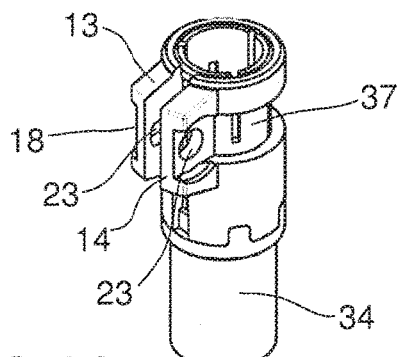
Figure 6E:
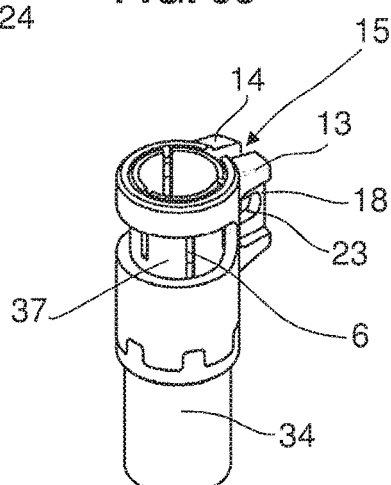

FIG. 3b shows the clamping apparatus with tube portions 2, 3 of a telescopic pole to be clamped having been inserted. The larger diameter outside tube portion 2 introduced into the tube sleeve 34 abuts against the inner shoulder 53. The smaller diameter inside tube portion 3 inserted into the upper end of the outside tube portion 2 is overlapped or encased by the outside tube portion 2 only in the region of the tube sleeve 34. The inside tube portion extends over the remaining length of the clamping apparatus 1 and beyond by protruding out of the upper opening of the clamping apparatus 1.

FIGS. 5 and 6 each show a clamping apparatus substantially according to the exemplary embodiment shown in FIGS. 1-4. However, said two exemplary embodiments differ by the form of the anti-rotation protection. The anti-rotation protection acts between the clamping clip 16 and the tube sleeve 34 and is obtained in both examples shown in FIGS. 5 and 6 as a result of positive-locking means.

In the preferred exemplary embodiment of FIG. 5, on the upper end of its lower non-tapered cylindrical portion, the tube sleeve 34 comprises a circumferential flange with two shoulders 31b which are each realized in a complementary manner to two shoulders 31a on the lower edge of the clamping clip 16. Consequently, in its one circumferential half, the clamping clip 16 comprises a length H1, which is measured in the axial direction and is longer than the length H2 in its other circumferential half. Correspondingly, in its one circumferential half, the tube sleeve 34 comprises a shorter length H3 than the length H4 of its other circumferential half.

In the preferred exemplary embodiment of FIG. 6, the anti-rotation protection is shown as teeth of clamping clip 16 and tube sleeve 34. In this case, on the upper end of its lower non-tapered cylindrical portion, the tube sleeve 34 comprises a circumferential flange with upwardly protruding teeth or ribs 31c. Correspondingly complementary downwardly directed teeth or ribs 31d on the lower end of the clamping clip 16 then engage in the spaces between the teeth or ribs of the tube sleeve 34 and thus prevent the tube sleeve 34 rotating relative to the clamping clip 16. Thanks to the anti-rotation protection, rotation of the clamping clip 16 about the outside tube portion 2 is prevented.

The clamping sleeve 37, however, independently of the type of anti-rotation protection between the clamping clip 16 and the tube sleeve 34, can be mounted so as to be freely rotatable or possibly even axially movable in relation to or inside the clamping clip 16 and, depending on the exemplary embodiment, also in relation to the tube sleeve 34.

Figure 8:
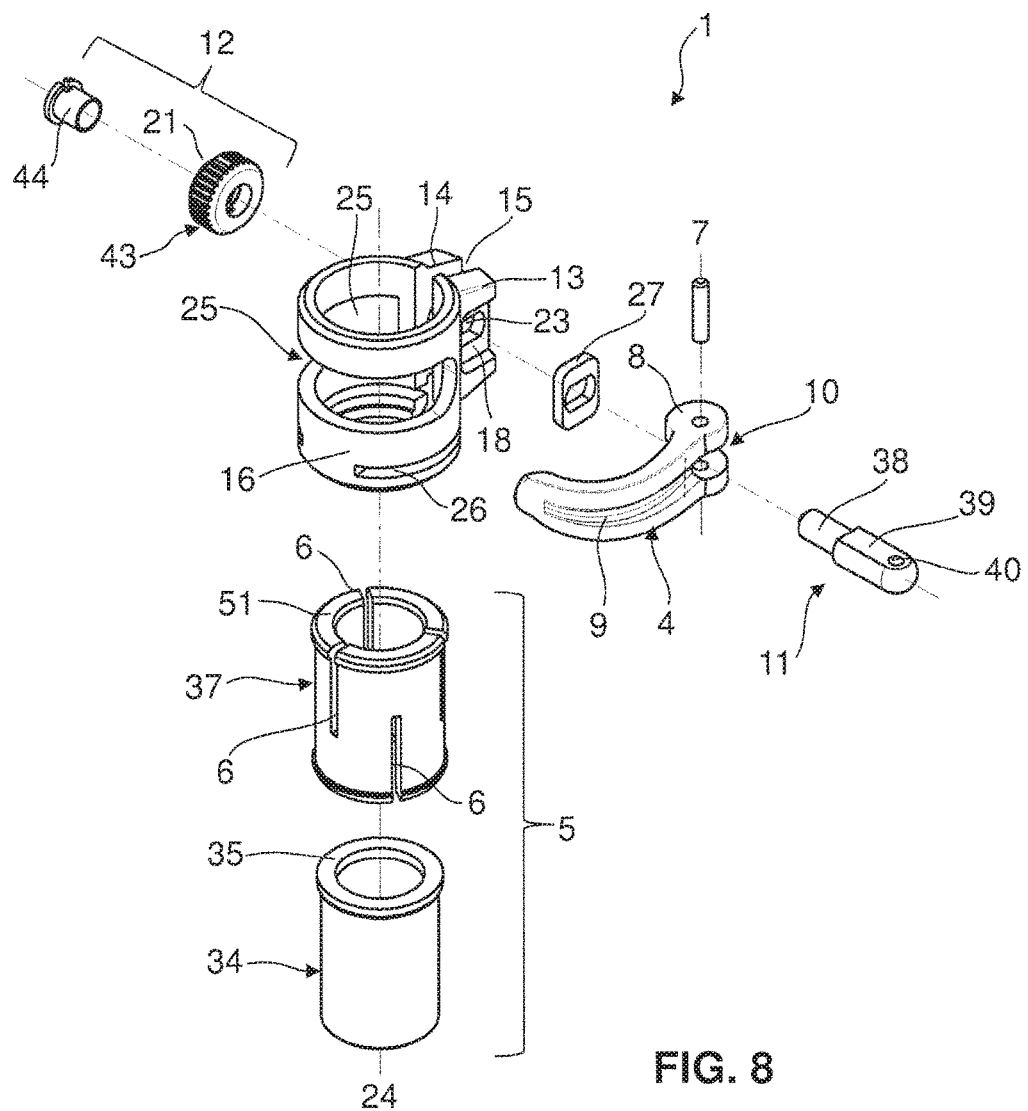
FIG. 8 shows an exploded view of the clamping apparatus according to FIG. 7.
Figure 11A:
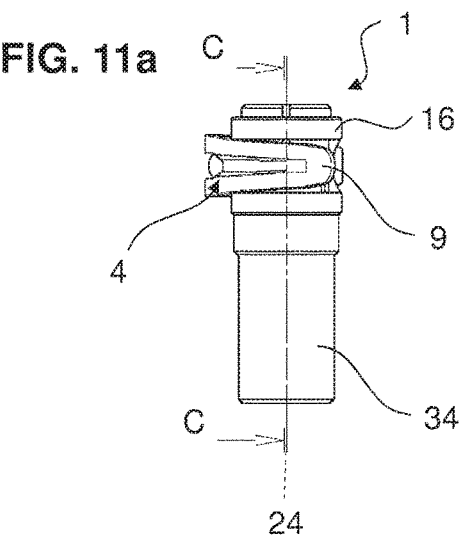
FIG. 11 shows a clamping apparatus according to a seventh preferred embodiment of the invention in the closed position, 11a showing a schematic representation of a side view of the clamping apparatus, 11b showing a perspective view, 11c showing a sectional representation along the line C-C of 11a without tube portions and 11d showing a sectional representation along the line C-C of 11a with tube portions.
Figure 11B:
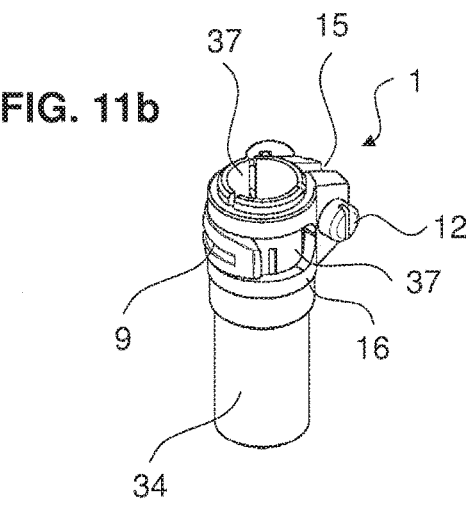
Figure 11C:
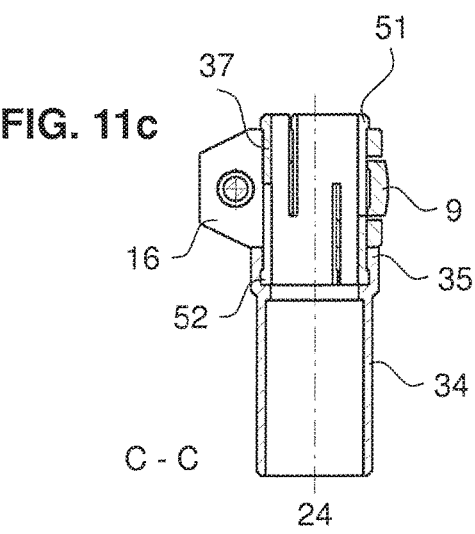
Figure 11D:
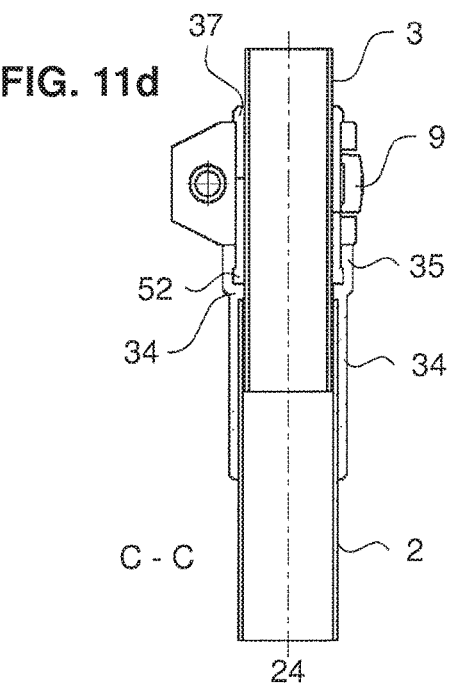

FIGS. 7 and 8 show an alternative preferred exemplary embodiment of the clamping apparatus. In said exemplary embodiment, below the opening 25, the clamping clip 16 comprises a slot 26 which extends around in part in the circumferential direction. According to FIGS. 7a and 7b, said slot is not developed in a continuous manner only in a region opposite the axial slot 15 arranged between the projections 13, 14. In said exemplary embodiment, the clamping sleeve 37 also comprises a flange 51, 52 in each case on its upper and lower end. In this case, the upper flange 51 projects beyond the upper end of the clamping clip 16 and consequently rests on the upper edge of the clamping clip 16. The lower flange 52 projects in the radial direction into the slot 26 of the clamping clip 16, which secures the axial position of the clamping sleeve 37 relative to the clamping clip 16. In the region of the clamping clip 16, where the slot 26 is not continuous, on its inside surface, the clamping clip 16 comprises a radial circumferential indentation for receiving the lower flange 52 of the clamping sleeve 37 in said region.

It can also be seen in FIGS. 7c and 7d that the clamping clip 16 additionally encompasses an upper circumferential flange 35 of the tube sleeve 34.

FIGS. 9 and 10 in each case show a clamping apparatus substantially according to the exemplary embodiment shown in FIGS. 7-8. However, said two exemplary embodiments differ by the form of the anti-rotation protection. The anti-rotation protection acts once again between the clamping clip 16 and the tube sleeve 34 and is obtained in both examples shown in FIGS. 9 and 10 as a result of positive-locking means.

For this purpose, in the exemplary embodiment of FIG. 9, the tube sleeve 34 comprises an upper flange 35, which comprises on its outer edge teeth or ribs 22b which are directed axially downward, i.e. away from the clamping clip. Said teeth 22b are encompassed according to FIG. 9a in a lower portion of the clamping clip 16, by ribs 22a which protrude axially with respect to the tube sleeve 34 in the inner wall of the clamping clip. Said ribs 22a are realized in a rounded manner at the top and bottom and upwardly open indentations 22c are located between them (cf. FIG. 9f). The ribs 22b of the tube sleeve consequently engage in an extensively positive locking manner in the upwardly open inside indentations 22c of the clamping clip and as a result form the anti-rotation protection between the clamping clip 16 and the tube sleeve 34.

In the exemplary embodiment of FIG. 10, on its outer edge, the upper flange 35 of the tube sleeve 34 comprises a partially circumferential recess, here approximately a quarter of the circumference of the upper flange 35, such that the flange comprises a smaller outside diameter on said circumferential portion than in the remaining protruding circumferential portion. The protruding portion of the flange 35 engages in the slot 26 of the clamping clip 16 and is arrested by the stop of the shoulders 56 on the two circumferential ends of the slot 26 of the clamping clip 16, which prevents the tube sleeve 34 rotating in relation to the clamping clip 16. Consequently, in a region of the slot 26 of the clamping clip 16, both the upper flange 35 of the tube sleeve 34 and the lower flange 52 of the clamping sleeve 37 engage in part in the slot 26 of the clamping clip 16.

FIG. 11 shows a further alternative preferred exemplary embodiment of the clamping apparatus. In this connection, this is a variant with a shortened clamping clip.

In the case of the previous exemplary embodiments in FIG. 1-10, the clamping sleeve 37 and the tube sleeve 34 are always arranged end-to-end, i.e. the lower end of the clamping sleeve 37 rests on the upper end of the tube sleeve 34 and the clamping clip 16 always also encompasses an upper flange 35 of the tube sleeve 34. In the present exemplary embodiment of FIG. 11, however, the clamping clip 16 only encompasses an upper portion of the clamping sleeve 37 and rests with its lower end on the upper edge of the tube sleeve 34. To do this, by way of its upper portion the tube sleeve 34 encompasses a lower portion of the clamping sleeve 37, including the lower flange thereof. The lower edge of the clamping sleeve 37 rests on the smaller diameter inner circumferential shoulder 53 of the tube sleeve 34 which forms the upper stop for the outside tube portion 2 from below.

Figure 15:
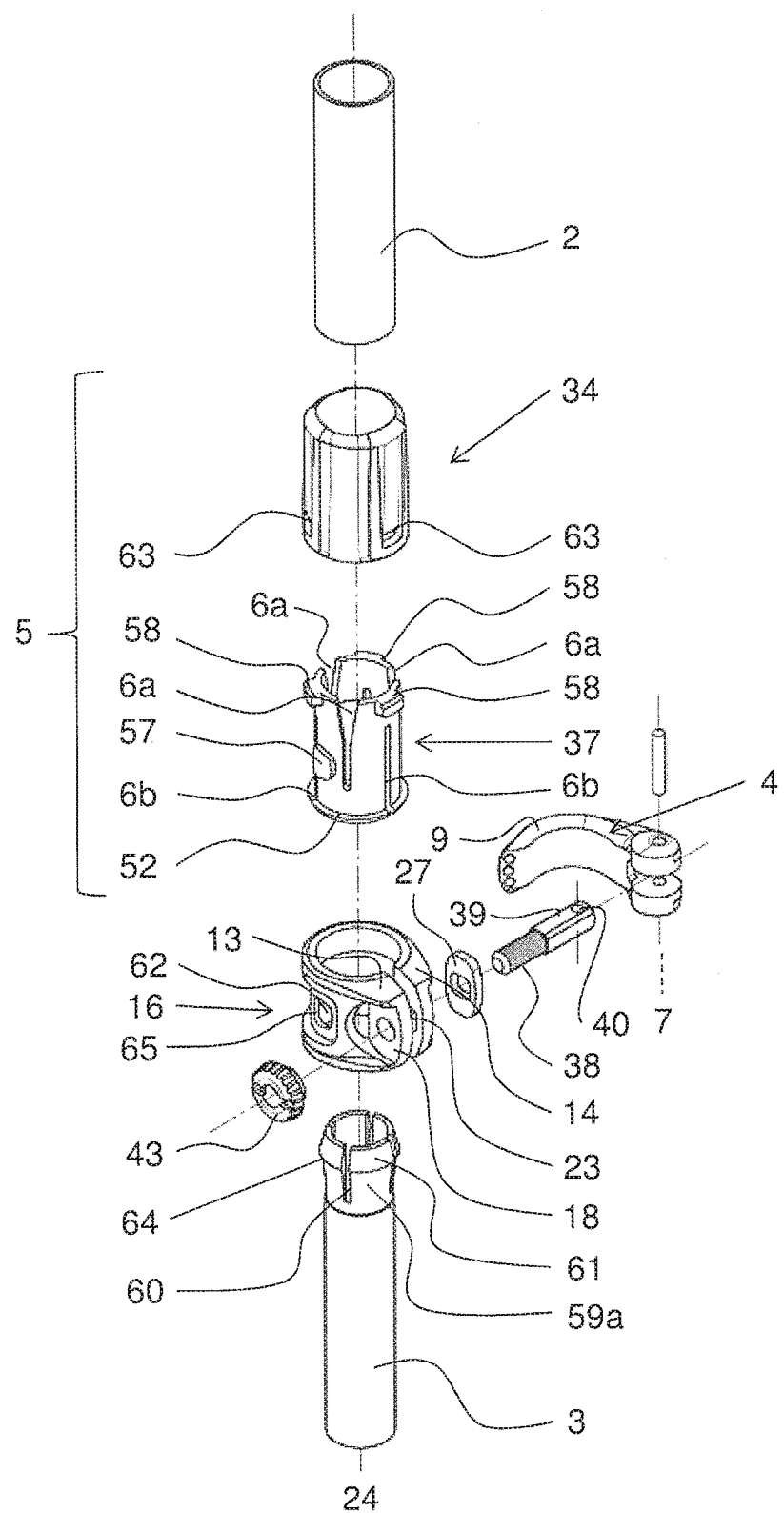
FIG. 15 shows an exploded view of the clamping apparatus according to FIG. 14.

FIGS. 14 and 15 show a further alternative preferred exemplary embodiment of the clamping apparatus. In this connection, this is a variant with a shortened clamping clip 16. In this case, in particular for the purposes of anti-rotation protection or fixing in the radial (with reference to twisting) and axial direction, the clamping clip 16 comprises at least one opening 62 for a radial knob 57 arranged on the clamping sleeve 37. The knob 57, in this case, engages in the clamping clip 16 from the inside. The clamping clip 16 comprises a web 65 between the opening for the lever arm 9 of the clamping lever 4 and the opening for the radial knob 57 in the axial direction. In said exemplary embodiment, the clamping sleeve 37, which is repeatedly slotted toward both ends, on its axial end facing the outside tube portion 2 additionally comprises three radial tongues 58 which engage from the inside in the radial direction in corresponding openings 63 (indentations are possible as an alternative) on the end of the tube sleeve 34 facing the clamping clip 16. In the present exemplary embodiment, the slots 6a of the clamping sleeve 37, which are open in the direction of the tube sleeve 34, are widened toward the end facing the tube sleeve 34. In the present exemplary embodiment, the inside tube portion 3 additionally comprises an insert element 59 which comprises a first axial portion 59a which projects out of the inside tube portion 3 and a second axial portion 59b which projects into the inside tube portion 3. In this case, the first axial portion 59a projecting out of the inside tube portion 3 is realized in a slotted manner, according to the exemplary embodiment shown in FIG. 14 with four axial slots 60 which are open toward the clamping clip 16, which results in the realization of four flexible tongues 61. The insert element can be inserted and just clamped, but it can also be additionally bonded.

LIST OF REFERENCES

| | |
|---|---|
| 1 | Clamping apparatus |
| 2 | Outside tube portion |
| 3 | Inside tube portion |
| 4 | Clamping lever |
| 5 | Plastic sleeve |
| 6 | Axial slot in 5 |
| 7 | Rotational axis of 4, axial pin |
| 8 | Roll-off region of 4 |
| 9 | Lever arm of 4 |
| 9a | Tip of 9 |
| 9b | Gripping knobs on 9a |
| 10 | Slot in 8 |
| 11 | Cross pin |
| 12 | Adjusting screw, knurled nut |
| 13 | First projection |
| 14 | Second projection |
| 15 | Gap between 13 and 14 |
| 16 | Clamping clip |
| 17 | Indentation in 14 for 12 |
| 18 | Indentation in 13 for 8 and 27 |
| 20 | Tapered portion of 34 |
| 21 | Toothed surface of 12 |
| 22a | Teeth on 16 |
| 22b | Teeth on 35 |
| 23 | Opening in 13 and 14 for 11 |
| 24 | Pole axis |
| 25 | Opening in 16 for 9 |
| 26 | Slot in 16 |
| 27 | Counter surface for 8 on 16, metal element |
| 28 | Cross web |
| 30 | Axial slot in 20 |
| 31a | Circumferential shoulder in 16 |
| 31b | Flange with shoulder in 34 |
| 31c | Teeth in 16 |
| 31d | Flange with teeth in 34 |
| 32 | Widening continuation on 27, continuation |
| 33 | Radial widening for 32 in 18 |
| 34 | Tube sleeve |
| 35 | Flange on the upper |

| | |
|---|---|
| | end of 34 |
| 36 | Slot in 12 |
| 37 | Clamping sleeve |
| 38 | Threaded portion of 11 |
| 39 | Flattened portion of 11 |
| 40 | Opening for 7 |
| 41 | Additional bore in 39 |
| 42 | Opening for 39 |
| 43 | Wide adjusting portion of 12 |
| 44 | Tapered portion of 12 |
| 51 | First flange on the upper end of 37 |
| 52 | Second flange on the lower end of 37 |
| 53 | Circumferential shoulder on inside surface of 34 |
| 54 | Partially circumferential indentation on inside surface of 16 |
| 55 | Partially circumferential recess in 35 |
| 56 | Shoulder on 35 |
| 57 | Knob on 37 |
| 58 | Radial tongue on 37 |
| 59 | Insert element on 3 |
| 59a | First axial portion of 59 protruding from 3 |
| 59b | Second axial portion of 59 projecting into 3 |
| 60 | Slot in 59 |
| 61 | Resilient tongue on 59 |
| 62 | Opening in 16 for 57 |
| 63 | Opening in 34 for 58 |
| 64 | Shoulder on 59 or 61 |
| 65 | Web between 62 and 25 |
| H1 | Longer half of 16 |
| H2 | Shorter half of 16 |
| H3 | Shorter half of 34 |
| H4 | Longer half of 34 |
| L | Overall length of 1 |
| U | Circumferential direction of 16 |

The invention claimed is:

1. A clamping apparatus for a hiking pole, trekking pole, Nordic walking pole, cross-country pole or ski pole that is operable between an open state for releasing an inside tube portion and a closed state for axially fixing the inside tube portion, which is insertable into an opening of the clamping apparatus when said clamping apparatus is in the open state,
wherein the clamping apparatus includes a plastic sleeve, which is fastenable on an outside tube portion which is insertable into a further opening of the clamping apparatus, encompasses the inside tube portion substantially directly at least in an axial portion and clamps the inside tube portion when the clamping apparatus is in the closed state,
wherein, the plastic sleeve is designed in a clampable manner in that the plastic sleeve either comprises at least one axial slot which makes the circumference of the plastic sleeve variable in said axial portion or alternatively is formed at least in regions from a deformable elastomer material,
wherein the clamping apparatus additionally comprises a clamping clip which is arranged coaxially with respect to the plastic sleeve, encompasses the plastic sleeve at least in part in the axial direction and clamps the plastic sleeve when closed,
wherein the clamping clip, at least in a region surrounding the plastic sleeve, comprises at least one axial slot, or alternatively comprises an elastic region, thus making the circumference of the clamping clip variable in said region surrounding the plastic sleeve,
wherein on the clamping clip a first projection is arranged on a first side of said axial slot or alternatively of said elastic region and a second projection is arranged on a second side of said axial slot or alternatively of said elastic region,
wherein each of said projections comprises a through opening which is arranged in a substantially perpendicular manner to an axis of the inside tube portion,
wherein a cross pin engages through the through opening, the cross pin having a stop on an outside of the second projection,
wherein a clamping lever is mounted on at least one of the projections, wherein the clamping lever comprises a lever arm which encompasses the clamping clip at least in part when the clamping apparatus is closed, and
wherein the clamping lever comprises a roll-off region which is eccentric about a rotational axis of the clamping lever, and wherein the spacing between the stop and a counter surface for clamping, said counter surface being arranged on the outside surface of the first projection, can be reduced as a result of pivoting the clamping lever into the closed position, and
wherein the plastic sleeve is formed from two separate coaxially arranged and interconnected components, of which a first of the two separate components is formed as a tube sleeve, which is arranged coaxially with respect to the clamping clip, for fastening the clamping apparatus on the outside tube portion, and a second of the two separate components is formed as a clamping sleeve, which is arranged coaxially to the tube sleeve and to the clamping clip, for clamping the inside tube portion which is insertable into the outside tube portion.

2. The clamping apparatus as claimed in claim 1, wherein when clamping, a diameter of the clamping sleeve is reduced, but not a diameter of the inside tube portion which is to be clamped.

3. The clamping apparatus as claimed in claim 2, wherein when clamping, additionally a diameter of a tapered upper portion of the tube sleeve is reduced.

4. The clamping apparatus as claimed in claim 1, wherein the clamping sleeve comprises at least two axially extending slots, or wherein alternatively the clamping sleeve comprises axially extending resilient regions.

5. The clamping apparatus as claimed in claim 4, wherein the clamping sleeve comprises at least three axially extending slots.

6. The clamping apparatus as claimed in claim 1, wherein the clamping apparatus comprises an element for anti-rotation protection between the clamping clip and the tube sleeve.

7. The clamping apparatus as claimed in claim 1, wherein at least on one axial end, the clamping sleeve comprises a circumferential flange.

8. The clamping apparatus as claimed in claim 1, wherein, when mounted on the outside tube portion, the tube sleeve is fastened on the outside tube portion by at least one of the following: frictional locking, positive locking, and material bonding.

9. The clamping apparatus as claimed in claim 1, wherein on an upper portion of the tube sleeve, the tube sleeve comprises an upper circumferential flange which is encompassed at least in part by the clamping clip.

10. The clamping apparatus as claimed in claim 1, wherein the clamping clip comprises an opening which extends around in the circumferential direction of the clamping clip at least in part, is arranged at a rear side of the slot and receives the lever arm in a circumferential direction at least in portions when the clamping apparatus is closed.

11. The clamping apparatus as claimed in claim 1, wherein the clamping clip comprises a slot which extends around in a circumferential direction of the clamping apparatus in part and in which a lower flange of the clamping sleeve and/or an upper flange of the tube sleeve engages.

12. The clamping apparatus as claimed in claim 1, wherein at an upper end facing the clamping sleeve, the tube sleeve comprises a flange which forms a lower stop for a lower end of the clamping clip facing the tube sleeve, or wherein the flange of the tube sleeve is surrounded at least in part by the clamping clip.

13. The clamping apparatus as claimed in claim 12, wherein the flange of the tube sleeve is a circumferential flange.

14. The clamping apparatus as claimed in claim 12, wherein the flange of the tube sleeve engages at least in part in a slot of the clamping clip.

15. The clamping apparatus as claimed in claim 12, wherein the flange of the tube sleeve is surrounded at least in part by the clamping clip.

16. The clamping apparatus as claimed in claim 1, wherein the cross pin on the outside surface of the first projection comprises the rotational axis for the clamping lever, which rotational axis is arranged perpendicular to the axis of the cross pin and parallel to the axis of the tube portion.

17. The clamping apparatus as claimed in claim 1, wherein both the tube sleeve and the clamping sleeve are formed from plastics material, but comprise a different material composition.

18. The clamping apparatus as claimed in claim 1, wherein the clamping clip is formed from at least one of hard plastics material and metal.

19. The clamping apparatus as claimed in claim 1, wherein the stop is designed such that a minimum spacing between the counter surface and the stop is adjustable in a variable manner.

20. A pole, having a clamping apparatus as claimed in claim 1, for adjusting the length of at least two tube portions.

21. The clamping apparatus as claimed in claim 1, wherein the clamping sleeve comprises at least two extending slots, wherein the slots are distributed evenly about the circumference, and only extend over part of an axial length of the plastic sleeve.

22. The clamping apparatus as claimed in claim 1, wherein the clamping apparatus comprises an element for anti-rotation protection between the clamping clip and the tube sleeve, wherein said element for anti-rotation protection is formed by a form closure between the clamping clip and the tube sleeve.

23. The clamping apparatus as claimed in claim 1, wherein at least on one axial end, the clamping sleeve comprises a circumferential flange in the form of at least one first flange on an upper end of the clamping sleeve remote from the tube sleeve, and a second flange on a lower end of the clamping sleeve.

24. The clamping apparatus as claimed in claim 1, wherein the clamping clip in a portion facing the tube sleeve below the clamping lever, comprises a slot which extends around in the circumferential direction of the clamping apparatus in part and in which at least one flange selected of the following flanges engages: a lower flange of the clamping sleeve, an upper flange of the tube sleeve.

25. The clamping apparatus as claimed in claim 1, wherein the cross pin on the outside surface of the first projection comprises the rotational axis for the clamping lever, which rotational axis is arranged perpendicular to the axis of the cross pin and parallel to the axis of the tube portion, wherein the through opening in the two projections is a hole that is closed all round and has a diameter within a range of 2-7 mm, wherein a diameter of the cross pin is within a range of 2-6 mm in a region that passes through said through openings.

26. The clamping apparatus as claimed in claim 1, wherein both the tube sleeve and the clamping sleeve are formed from plastics material, but comprise a different material composition, wherein the tube sleeve is formed at least in part from a material with resilient properties, and is formed from a softer plastics material than the clamping sleeve, wherein the tube sleeve is formed from a thermoplastic material, selected from the group consisting of: acrylonitrile butadiene rubber (ABS), polyamide (PA), polymethyl methacrylate (PMMA), polycarbonate (PC), polyethylene terephthalate (PET), polyethylene (PE), polypropylene (PP), polystyrene (PS), poly ether ketone (PEEK) and polyvinyl chloride (PVC), or from a mixture of such plastics materials, and wherein the clamping sleeve is formed from a plastics material with increased friction in relation to the material of the tube sleeve.

27. The clamping apparatus as claimed in claim 1, wherein the clamping clip is formed from hard plastics material in the form of ABS or fiber-reinforced thermoplastic resin, or a light non-ferrous alloy, or thin-walled stainless steel.

28. The clamping apparatus as claimed in claim 1, wherein the stop is formed so as to be adjustable, wherein the stop is formed with a thread and the cross pin with a counter thread, and the stop is formed as a nut or screw having at least one of the following: circumferential teeth, a comb, and a groove for the engagement of an adjusting tool.

29. A pole for hiking, trekking, Nordic walking, cross-country skiing or alpine skiing, having a clamping apparatus as claimed in claim 1, for adjusting the length of at least two tube portions, wherein the inside tube portion which is to be clamped by the clamping apparatus is formed with or without any slots.

* * * * *